(12) United States Patent
Elkovitch et al.

(10) Patent No.: US 8,450,412 B2
(45) Date of Patent: May 28, 2013

(54) FLAME RETARDANT POLYAMIDE COMPOSITION, METHOD, AND ARTICLE

(75) Inventors: Mark Elkovitch, Selkirk, NY (US); Sai-Pei Ting, Slingerlands, NY (US); Robert Russell Gallucci, Mt. Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 14 days.

(21) Appl. No.: 12/644,272

(22) Filed: Dec. 22, 2009

(65) Prior Publication Data

US 2011/0152431 A1    Jun. 23, 2011

(51) Int. Cl.
*C08L 25/00* (2006.01)
*C08L 71/00* (2006.01)
*C08L 77/00* (2006.01)
*C08L 67/04* (2006.01)
*C08G 65/44* (2006.01)

(52) U.S. Cl.
USPC ............. 524/514; 524/430; 524/538; 525/88; 525/93; 525/94; 525/133

(58) Field of Classification Search
USPC ................ 524/430, 514, 538; 525/88, 93, 94, 525/133
See application file for complete search history.

(56) References Cited

U.S. PATENT DOCUMENTS

| | | | |
|---|---|---|---|
| 2,071,250 A | 7/1931 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,465,319 A | 3/1949 | Whinfield | |
| 2,512,606 A | 6/1950 | Bolton et al. | |
| 2,720,502 A | 10/1955 | Caldwell | |
| 2,727,881 A | 12/1955 | Caldwell | |
| 2,822,348 A | 2/1958 | Haslam | |
| 3,047,539 A | 7/1962 | Pengilly | |
| 3,306,874 A | 2/1967 | Hay | |
| 3,379,792 A | 4/1968 | Finholt | |
| 3,671,487 A | 6/1972 | Abolins | |
| 3,716,589 A | 2/1973 | Kotanigawa et al. | |
| 3,953,394 A | 4/1976 | Fox et al. | |
| 3,979,464 A | 9/1976 | Leach | |
| 4,128,526 A | 12/1978 | Borman | |
| 4,128,728 A | 12/1978 | Arnold et al. | |
| 4,226,761 A | 10/1980 | Cooper et al. | |
| 4,283,574 A | 8/1981 | Leach | |
| 4,301,308 A | 11/1981 | Canavesi et al. | |
| 4,546,093 A | 10/1985 | Chang et al. | |
| 4,664,972 A | 5/1987 | Connolly | |
| 4,769,424 A | 9/1988 | Takekoshi et al. | |
| 4,814,392 A | 3/1989 | Shea et al. | |
| 4,822,836 A | 4/1989 | Wroczynski | |
| 4,871,816 A | 10/1989 | Percec et al. | |
| 4,879,346 A | 11/1989 | Bopp et al. | |
| 4,970,272 A | 11/1990 | Gallucci | |
| 5,021,543 A | 6/1991 | Mayska et al. | |
| 5,032,635 A | 7/1991 | Avakian et al. | |
| 5,061,746 A | 10/1991 | Gallucci et al. | |
| 5,110,896 A | 5/1992 | Waggoner et al. | |
| 5,132,365 A | 7/1992 | Gallucci | |
| 5,169,887 A | 12/1992 | Snow et al. | |
| 5,204,438 A | 4/1993 | Snow et al. | |
| 5,225,270 A | 7/1993 | Bhoori et al. | |
| 5,230,359 A | 7/1993 | Ollivier | |
| 5,258,455 A | 11/1993 | Laughner et al. | |
| 5,281,686 A | 1/1994 | Blohm et al. | |
| 5,294,655 A | 3/1994 | Lee, Jr. et al. | |
| 5,357,003 A | 10/1994 | Smits et al. | |
| 5,357,022 A * | 10/1994 | Banach et al. | .......... 528/29 |
| 5,364,898 A | 11/1994 | Lee, Jr. et al. | |
| 5,385,984 A | 1/1995 | Blohm et al. | |
| 5,470,913 A | 11/1995 | van der Meer et al. | |
| 5,484,858 A | 1/1996 | Smits et al. | |
| 5,561,193 A | 10/1996 | Gottschalk et al. | |
| 5,596,048 A | 1/1997 | Blohm et al. | |
| 5,612,425 A | 3/1997 | Weber et al. | |
| 5,618,885 A | 4/1997 | Kotek et al. | |
| 5,625,011 A | 4/1997 | Palsule | |
| 5,693,700 A | 12/1997 | Venkataramani et al. | |
| 5,714,550 A | 2/1998 | Shaw | |
| 5,750,603 A | 5/1998 | Asrar | |
| 5,817,891 A | 10/1998 | Brocker et al. | |
| 5,916,952 A | 6/1999 | Romenesko et al. | |
| 6,025,419 A | 2/2000 | Kasowski et al. | |
| 6,043,315 A | 3/2000 | Gottschalk et al. | |
| 6,072,011 A | 6/2000 | Hoover | |
| 6,093,771 A | 7/2000 | Wunsch et al. | |
| 6,339,131 B1 | 1/2002 | Cella et al. | |
| 6,593,411 B2 | 7/2003 | Koevoets et al. | |
| 7,087,666 B2 | 8/2006 | Hoerold et al. | |
| 7,115,677 B2 | 10/2006 | Harashina et al. | |
| 7,148,276 B2 | 12/2006 | Bauer et al. | |
| 7,166,243 B2 | 1/2007 | Elkovitch et al. | |
| 7,205,346 B2 | 4/2007 | Harashina | |

(Continued)

FOREIGN PATENT DOCUMENTS

CA    2052488 A1    4/1992
EP    0133641 A1    3/1985

(Continued)

OTHER PUBLICATIONS

Allen and Hendrick, Synthesis and properties of xylenyl ether-dimethylsioloxane triblock polymers, Polymer Bulletin, vol. 19, pp. 103-110 (1988).

(Continued)

*Primary Examiner* — Ana Woodward
(74) *Attorney, Agent, or Firm* — Cantor Colburn LLP

(57) ABSTRACT

A composition is prepared by melt blending specific amounts of a polyamide, a flame retardant that includes brominated polystyrene, a polymeric flame retardant synergist, and a compatibilizing agent. The polymeric flame retardant synergist can be a poly(arylene ether), a poly(arylene ether)-polysiloxane block copolymer, or a mixture thereof. The composition is useful for molding automotive and electrical parts.

26 Claims, No Drawings

U.S. PATENT DOCUMENTS

| | | | |
|---|---|---|---|
| 7,247,666 | B2 | 7/2007 | Urabe et al. |
| 7,255,814 | B2 | 8/2007 | Hoerold et al. |
| 7,259,200 | B2 | 8/2007 | Bauer et al. |
| 7,273,901 | B2 | 9/2007 | Sicken et al. |
| 7,329,708 | B2 | 2/2008 | Birsak et al. |
| 7,332,534 | B2 | 2/2008 | Knop et al. |
| 7,439,288 | B2 | 10/2008 | Sicken et al. |
| 7,449,507 | B2 | 11/2008 | Fishburn |
| 7,449,508 | B2 | 11/2008 | Steib et al. |
| 7,488,766 | B2 | 2/2009 | Peters et al. |
| 7,534,822 | B2 | 5/2009 | Elkovitch et al. |
| 7,541,421 | B2 | 6/2009 | Carrillo et al. |
| 7,576,150 | B2 * | 8/2009 | Klei et al. ............. 524/127 |
| 7,592,382 | B2 | 9/2009 | Borade et al. |
| 7,608,651 | B2 | 10/2009 | Borade et al. |
| 7,803,856 | B2 | 9/2010 | Perego et al. |
| 7,816,438 | B2 | 10/2010 | Seki et al. |
| 7,838,580 | B2 | 11/2010 | Bauer et al. |
| 7,847,032 | B2 | 12/2010 | Guo et al. |
| 7,947,201 | B2 | 5/2011 | Ting |
| 8,017,697 | B2 | 9/2011 | Carrillo et al. |
| 8,263,697 | B2 | 9/2012 | Miyoshi et al. |
| 2004/0176506 | A1 | 9/2004 | Sicken et al. |
| 2004/0225040 | A1 | 11/2004 | Hoerold |
| 2004/0260036 | A1 | 12/2004 | Fishburn |
| 2005/0171323 | A1 | 8/2005 | Kamps et al. |
| 2005/0250885 | A1 | 11/2005 | Mercx et al. |
| 2005/0261417 | A1 | 11/2005 | Mezzenga et al. |
| 2006/0020064 | A1 | 1/2006 | Bauer et al. |
| 2006/0058432 | A1 | 3/2006 | Perego et al. |
| 2006/0089435 | A1 | 4/2006 | Hoerold et al. |
| 2006/0106139 | A1 | 5/2006 | Kosaka et al. |
| 2006/0111484 | A1 | 5/2006 | Fishburn |
| 2006/0111548 | A1 | 5/2006 | Elkovitch et al. |
| 2006/0149000 | A1 | 7/2006 | Ikuta et al. |
| 2006/0167143 | A1 | 7/2006 | Borade et al. |
| 2006/0182967 | A1 | 8/2006 | Kosaka et al. |
| 2006/0208239 | A1 | 9/2006 | Bauer et al. |
| 2007/0020815 | A1 | 1/2007 | Chaware et al. |
| 2007/0100088 | A1 | 5/2007 | Gallucci et al. |
| 2007/0112132 | A1 | 5/2007 | Zhao et al. |
| 2007/0208144 | A1 | 9/2007 | Delsman et al. |
| 2007/0244231 | A1 | 10/2007 | Borade et al. |
| 2008/0071036 | A1 | 3/2008 | Delsman et al. |
| 2011/0190453 | A1 | 8/2011 | Carrillo et al. |
| 2011/0190454 | A1 | 8/2011 | Carrillo et al. |

FOREIGN PATENT DOCUMENTS

| | | | |
|---|---|---|---|
| EP | 683209 | A2 | 11/1995 |
| EP | 714951 | A1 | 6/1996 |
| EP | 1253164 | A1 | 10/2002 |
| GB | 1353501 | A | 5/1974 |
| JP | 252214 | A | 11/1986 |
| JP | 405230360 | * | 9/1993 |
| JP | 200038 | A | 7/1994 |
| JP | 231769 | A | 8/2004 |
| WO | 87/07281 | A1 | 12/1987 |
| WO | 9711123 | A1 | 3/1997 |
| WO | 98/08898 | A1 | 3/1998 |
| WO | 01/40353 | A1 | 6/2001 |
| WO | 2007/106296 | A2 | 9/2007 |
| WO | 2011134622 | A1 | 11/2011 |
| WO | 2011134623 | A1 | 11/2011 |
| WO | 2012007124 | A1 | 1/2012 |

OTHER PUBLICATIONS

ASTM D1238, Standard Test Method for Melt Flow Rates of Thermoplastics by Extrusion Plastometer.
ASTM D2240-05, Standard Test Method for Rubber Property-Durometer Hardness.
ASTM D2857-95, Standard Practice for Dilute Solution Viscosity of Polymers.
ASTM D3763-08, Standard Test Method for High Speed Puncture Properties of Plastics Using Load and Displacement Sensors.
ASTM D638, Standard Test Method for Tensile Properties of Plastics.
ASTM D790, Standard Test Method for Flexural Properties of Unreinforced and Reinforced Plastics and Electrical Insulating Materials.
Chan et al., Facile Quantitative Analysis of Hydroxyl End Groups of Poly (2,6-dimethyl-1, 4-phenylene oxide)s by P NMR Spectroscopy, Macromolecules, vol. 27, Abstract, 1 pages.
JP 2002047409, Publication date: Feb. 12, 2002, Abstract.
JP 2003105193, Publication date: Apr. 9, 2003, Abstract.
JP 2004231789, Publication date: Aug. 19, 2004, Abstract.
JP 2005333698, Publication date: Dec. 2, 2005, Abstract.
JP 3126744, Publication date: May 29, 1991, Abstract.
JP 407552, Publication date: Mar. 11, 1992, Abstract.
JP 57-195122, Publication date: Nov. 30, 1982, Abstract.
JP 61-252214, Publication date: Nov. 10, 1986, Abstract.
JP 6200015, Publication date: Jul. 19, 1994, Abstract.
JP 63202652, Publication date: Aug. 22, 1988, Abstract.
JP 9003322, Publication date: Jan. 7, 1997, Abstract.
JP 9279044, Publication date: Oct. 28, 1997, Abstract.
Pape et al., The Role of Silicone Powders in Reducing the Heat Release Rate and Evolution of Smoke in Flame Retardant Thermoplastics, Journal of Vinyl & Additive Technology, Sep. 1997, vol. 3, No. 3, Abstract.
International Search Report, PCT/US2009/064110, Date of mailing: May 27, 2010, 8 pages.
Skoog et al., Principles of Instrumental Analysis, 4th Edition, Saunders College Publishers, Harcourt Brace College Publishers, New York (1992), pp. 568-578.
UL 1581, Reference Standard for Electrical Wires, Cables, and Flexible Cords, May 6, 2003, 236 pages.
UL 94, Tests for Flammability of Plastic Materials for Parts in Devices and Appliances, Dec. 13, 2003, 52 pages.
Written Opinion and International Search Report, International Application No. PCT/US2009/045280, International Filing Date: May 27, 2009 (8 pages).
Written Opinion of the International Searching Authority, International Application No. PCT/US2009/064110, International Filing Date: Nov. 12, 2009 (5 pages).
ASTM D3763-08 "Standard Test Method for High Speed Puncture Properties of Plastics Using Load and Displacement Sensors", 2008, 9 pages.
International Search Report and Written Opinion for PCT/IB2010/055482, mailing date May 13, 2011, 4 pages.
Written Opinion for PCT/IB2010/055482, international filed Nov. 29, 2010, 6 pages.
ASTM D 648-07, Standard Test Method for Deflection Temperature of Plastics Under Flexural Load in the Edgewise Position, Downloaded Jan. 12, 2009, 13 pages.
Clariant, Exolit OP 1312, Flame Retardants PHP, Edition Feb. 4, 2009, 2 pages.
Clariant, Exolit Overview, Nov. 2008 Edition, 8 pages.
Albemarle, Saytex HP-3010 Flame Retardant, Feb. 2008, 2 pages.
Weil et al., Flame Retardants for Plastics and Textiles, Practical Applications, brominated book excerpt, 8 pages.
Chan et al., Facile Quantitative Analysis of Hydroxyl End Groups of Poly(2,6-dimethyl-1, 4-phenylene oxide)s by P NMR Spectroscopy, Macromolecules, vol. 27 (22), 1994, Abstract, 1 page.
UL 1581, Underwriters Laboratories, Inc. (UL), Reference Standard for Electrical Wires, Cables, and Flexible Cords, 2003, 236 pages.
Weil et al., "Flame Retardants for Plastics and Textiles: Practical Applications", 2009, pp. 88-90.
PCT/US2010/058146 International Search Report, date of mailing Aug. 16, 2011, 5 pages.
PCT/US2010/058146 Written Opinion, date of mailing Aug. 16, 2011, 4 pages.
PCT/US2010/058166 International Search Report, date of mailing Aug. 17, 2011, 5 pages.
PCT/US2010/058166 Written Opinion, date of mailing Aug. 17, 2011, 4 pages.

JP05-230360; Sep. 7, 1993; Machine Translation (19 pages).
U.S. Appl. No. 13/650,366, filed Oct. 12, 2012.
U.S. Appl. No. 13/705,309, filed Dec. 5, 2012.
DE3834086 A1, Apr. 19, 1990, Abstract Only, 2 pages.
International Search Report and Written Opinion; International Application No. PCT/US2012/044897; International Filing Date Jun. 29, 2012; Date of Mailing Jan. 23, 2013; 8 pages.

JP2010018906 A, Jan. 28, 2010, Abstract Only, 1 page.
VYDYNE 21ZLV, Product Data Sheet, downloaded from http://53af052f81856517219b-5c898576c0a79c837f1ed1d0ad49d31c.r80.cf1.rackcdn.com/949F8095-64A7-ECED-713C-C80E3E51227D on Jun. 1, 2012, 1 page.

* cited by examiner

US 8,450,412 B2

FLAME RETARDANT POLYAMIDE COMPOSITION, METHOD, AND ARTICLE

BACKGROUND OF THE INVENTION

Polyamides or "nylons" are polymers used to make a wide variety of consumer goods, including women's stockings, parachutes, ropes, and components of tires. One disadvantage of polyamides is that when they are exposed to flame they can break down to form hazardous ash and fumes. For uses that may include exposure to flame it is therefore important to improve the flame retardancy of polyamides and their blends with other polymers.

Blending polyamides with poly(arylene ether)s can improve the flame retardancy of the polyamide and also improve some physical properties. However, the improvement in flame retardancy is not sufficient for many applications. Accordingly, considerable effort has been directed to identifying additives that can improve the flame retardancy of polyamide and polyamide/poly(arylene ether) blends without unduly compromising their desirable physical properties.

In one approach, metal dialkylphosphinate flame retardants have been used to improve the flame retardancy of polyamide/poly(arylene ether) blends. See, for example, U.S. Pat. No. 7,534,822 to Elkovitch et al., and U.S. Pat. No. 7,592,382 to Borade et al. Although metal dialkylphosphinates have been demonstrated to improve the flame retardancy of polyamide/poly(arylene ether) blends, relatively large amounts are needed to achieve a high flame retardancy rating, such as a UL 94 V-0 rating. Use of such large amounts of metal dialkylphosphinates is expensive and is accompanied by a degradation in physical properties of the polymer blend. Use of large amounts of metal dialkylphosphinate flame retardants also increases the density (specific gravity) of the blends, thereby discouraging their use to form parts for automotive use and other weight-sensitive applications.

In another approach, blends of brominated polymers and antimony trioxide are used to improve the flame retardancy of polyamides. See, for example, Japanese Patent Application Publication Nos. JP 10-168307A of Yakabe et al., and JP 2000-281896 A of Endo et al. Relatively large amounts of the brominated polymers and antimony trioxide are required, the physical properties of the blends are degraded, and the density of the blends is increased.

There therefore remains a need for polyamide/poly (arylene ether) blends that exhibit an improved balance of flame retardancy, physical properties, density, and cost.

BRIEF DESCRIPTION OF THE INVENTION

One embodiment is a composition comprising the product of melt blending: about 30 to about 60 weight percent of a polyamide, a flame retardant comprising about 10 to about 25 weight percent brominated polystyrene, and about 5 to about 30 weight percent of a polymeric flame retardant synergist selected from the group consisting of poly(arylene ether)s, poly(arylene ether)-polysiloxane block copolymers, and mixtures thereof; wherein all weight percent are based on the total weight of the composition.

Another embodiment is a method of forming a composition, comprising: melt blending about 30 to about 60 weight percent of a polyamide, a flame retardant comprising about 10 to about 25 weight percent brominated polystyrene, and about 5 to about 30 weight percent of a polymeric flame retardant synergist selected from the group consisting of poly(arylene ether)s, poly(arylene ether)-polysiloxane block copolymers, and mixtures thereof to form a composition; wherein all weight percent are based on the total weight of the composition. Compositions formed by the method are also described.

Another embodiment is an article comprising any of the compositions described herein.

These and other embodiments are described in detail below.

DETAILED DESCRIPTION OF THE INVENTION

The present inventors have discovered that the addition of a polymeric flame retardant synergist markedly improves the balance of flame retardancy, physical properties, density, and cost for polyamides incorporating a brominated polystyrene flame retardant. Thus, one embodiment is a composition comprising the product of melt blending: about 30 to about 60 weight percent of a polyamide; a flame retardant comprising about 10 to about 25 weight percent brominated polystyrene; and about 5 to about 30 weight percent of a polymeric flame retardant synergist selected from the group consisting of poly (arylene ether)s, poly(arylene ether)-polysiloxane block copolymers, and mixtures thereof; and wherein all weight percent are based on the total weight of the composition.

The composition is prepared by melt blending the polyamide, the brominated polystyrene, the polymeric flame retardant synergist, and any optional components. Melt blending is typically conducted at a temperature of about 270 to about 320° C., specifically about 280 to about 310° C., more specifically about 290 to about 300° C. Apparatus for melt blending is known in the art and includes, for example, Brabender mixers and extruders, including single-screw and twin-screw extruders.

A polyamide is one of the melt-blended components. Polyamides, also known as nylons, are characterized by the presence of a plurality of amide (—C(O)NH—) groups, and are described in U.S. Pat. No. 4,970,272 to Gallucci. Suitable polyamides include polyamide-6, polyamide-6,6, polyamide-4, polyamide-4,6, polyamide-12, polyamide-6,10, polyamide 6,9, polyamide-6,12, amorphous polyamides, polyamide 6/6T and polyamide 6,6/6T with triamine contents below 0.5 weight percent, polyamide 9T, and combinations thereof. In some embodiments, the polyamide comprises polyamide-6,6. In some embodiments, the polyamide comprises polyamide-6 and polyamide-6,6. In some embodiments, the polyamide has a melting point ($T_m$) greater than or equal to 171° C. When the polyamide comprises a super tough polyamide, that is, a rubber-toughened polyamide, the composition may or may not contain a separate impact modifier.

Polyamides may be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamides are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent (wt %) solution in 96 wt % sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In one embodiment, the polyamide comprises a polyamide having an amine end group concentration greater than or equal to 35 microequivalents amine end group per gram of polyamide (μeq/g) as determined by titration with HCl. The amine end group concentration may be greater than or equal to 40 μeq/g, or, more specifically, greater than or equal to 45 μeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The polyamide is used in an amount of about 30 to about 60 weight percent, based on the total weight of the composition. Within this range, the polyamide amount can be at least about 35 weight percent. Also within this range, the polyamide amount can be up to about 55 weight percent, specifically up to about 50 weight percent, more specifically up to about 45 weight percent, still more specifically up to about 40 weight percent.

Another melt-blended component is a flame retardant comprising a brominated polystyrene. Brominated polystyrenes are known in the art and described, for example, in E. D. Weil and S. V. Levchik, eds., "Flame Retardants for Plastics and Textiles; Practical Applications", Cincinnati, Ohio: Hanser Publication, pages 89-101 (2009), and references 25-29 cited therein. As used herein, the term "brominated polystyrene" refers to a polystyrene (or other poly(alkenyl aromatic)) comprising, on average, at least one bromine atom per styrene (or other alkenyl aromatic) residue. The average number of bromine atoms per styrene (or other alkenyl aromatic) residue can be up to 8 for styrene, or higher for other alkenyl aromatics. The brominated polystyrene can have a number average molecular weight of about 50,000 to about 10,000,000 atomic mass units, specifically about 100,000 to about 5,000,000 atomic mass units, more specifically about 250,000 to about 2,000,000 atomic mass units. Brominated polystyrenes can be prepared, for example, by bromination of polystyrene, or by polymerization of brominated styrenes.

In some embodiments, the brominated polystyrene comprises an average of about 2 to about 4 bromine atoms per phenyl ring. Within this range, the number of bromine atoms per phenyl ring can be at least about 2.5. Also within this range, the number of bromine atoms per phenyl ring can be up to about 3. In some embodiments, the brominated polystyrene comprises less than or equal to 5 mole percent bromination of aliphatic carbon atoms. The mole percent bromination of aliphatic carbon atoms can be less than or equal to 3 mole percent, specifically less than or equal to 1 weight percent, more specifically less than or equal to 0.5 mole percent, still more specifically less than or equal to 0.1 mole percent. For example, the brominated polystyrene can have an average of about 2.7 bromine atoms per phenyl ring, essentially no bromination of the aliphatic carbon atoms, and a total of about 68.5 weight percent bromine.

The brominated polystyrene is used in an amount of about 10 to about 25 weight percent, based on the total weight of the composition. Within this range, the brominated polystyrene amount can be at least about 12 weight percent. Also within this range, the brominated polystyrene amount can be up to about 20 weight percent, specifically up to about 18 weight percent.

The flame retardant can, optionally, further comprise (or exclude) other components in addition to the brominated polystyrene. For example, in some embodiments, the flame retardant further comprises about 1 to about 10 weight percent antimony trioxide. In some embodiments, the antimony trioxide has a particle size of about 5 to about 20 micrometers.

As another example, in some embodiments, the flame retardant further comprises about 0.05 to about 0.5 weight percent of a poly(styrene-acrylonitrile)-encapsulated poly(tetrafluoroethylene). Poly(styrene-acrylonitrile)-encapsulated poly (tetrafluoroethylene)s are known in the art as are methods for their preparation, and they are also commercially available.

Other optional components of the flame retardant include, for example, triaryl phosphates (such as triphenyl phosphate, alkylated triphenyl phosphates, resorcinol bis(diphenyl phosphate), resorcinol bis(di-2,6-xylyl phosphate), and bisphenol A bis(diphenyl phosphate)), metal dialkylphosphinates (such as aluminum tris(diethylphosphinate)), melamine salts (such as melamine cyanurate, melamine phosphate, melamine pyrophosphate, and melamine polyphosphate), metal borate salts (such as zinc borate), metal hydroxides (such as magnesium hydroxide and aluminum hydroxide), and combinations thereof. These optional flame retardant components, when present, are generally used in an amount of about 0.5 to about 15 weight percent, specifically about 1 to about 10 weight percent, more specifically about 2 to about 5 weight percent, based on the total weight of the composition. Any one of these optional flame retardants can be excluded.

Triaryl phosphates include those comprising phenyl groups, substituted phenyl groups, or a combination of phenyl groups and substituted phenyl groups, and bis-aryl phosphate esters based upon resorcinol such as, for example, resorcinol bis-diphenylphosphate, as well as those based on bisphenols such as, for example, bisphenol A bis-diphenylphosphate. In some embodiments, the organophosphate ester is a triaryl phosphate selected from tris(alkylphenyl) phosphate (for example, CAS No. 89492-23-9 or CAS No. 78-33-1), resorcinol bis(diphenyl phosphate) (for example, CAS No. 57583-54-7), bisphenol A bis(diphenyl phosphate) (for example, CAS No. 181028-79-5), triphenyl phosphate (for example, CAS No. 115-86-6), tris(isopropylphenyl) phosphate (for example, CAS No. 68937-41-7), and mixtures of two or more of the foregoing organophosphate esters.

In some embodiments the organophosphate ester comprises a bis-aryl phosphate having the structure

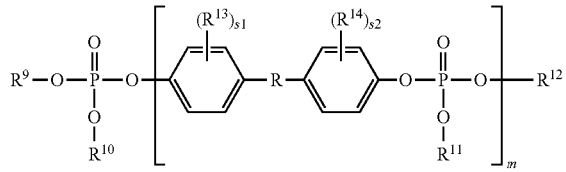

wherein R is independently at each occurrence a $C_1$-$C_{12}$ alkylidene group; $R^{13}$ and $R^{14}$ are independently at each occurrence a $C_1$-$C_5$ alkyl group; $R^9$, $R^{10}$, and $R^{12}$ are independently $C_1$-$C_{12}$ hydrocarbyl; $R^{11}$ is independently at each occurrence $C_1$-$C_{12}$ hydrocarbyl; m is an integer equal to 1 to 25; and s1 and s2 are independently at each occurrence an integer equal to 0, 1, or 2. In some embodiments $OR^9$, $OR^{10}$, $OR^{11}$ and $OR^{12}$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane, and 1,1-bis(4-hydroxyphenyl) ethane. In some embodiments, the bisphenol comprises bisphenol A.

A metal dialkylphosphinate is a salt comprising at least one metal cation and at least one dialkylphosphinate anion. In some embodiments, the metal dialkylphosphinate has the formula

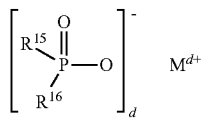

wherein $R^{15}$ and $R^{16}$ are each independently $C_1$-$C_6$ alkyl; M is calcium, magnesium, aluminum, or zinc; and d is 2 or 3. Examples of $R^{15}$ and $R^{16}$ include methyl, ethyl, n-propyl, isopropyl, n-butyl, tert-butyl, n-pentyl, n-hexyl, and cyclohexyl. In some embodiments, $R^{15}$ and $R^{16}$ are ethyl, M is aluminum, and d is 3 (that is, the metal dialkylphosphinate is aluminum tris(diethylphosphinate)). In some embodiments, the metal dialkylphosphinate is in particulate form. In some embodiments, the metal dialkylphosphinate particles have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate can be added to the composition in the form of a masterbatch with a polymer, such as the polyamide, the polymeric flame retardant synergist, another polymer, or combination thereof, to form a masterbatch. The metal dialkylphosphinate masterbatch comprises the metal dialkylphosphinate at a concentration greater than is present in the composition as a whole. Employing a masterbatch for the addition of the metal dialkylphosphinate to the other components of the composition can facilitate addition and improve distribution of the metal dialkylphosphinate.

In some embodiments, the flame retardant comprises a nitrogen-containing flame retardant comprising a nitrogen-containing heterocyclic base and the conjugate acid of a phosphate, pyrophosphate, polyphosphate, or cyanurate base. In some embodiments in which the conjugate acid is of a phosphate, pyrophosphate, or polyphosphate, the nitrogen-containing flame retardant has the formula

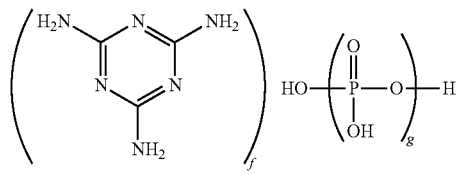

wherein g is 1 to about 10,000 and the ratio of f to g is about 0.5:1 to about 1.7:1, specifically 0.7:1 to 1.3:1, more specifically 0.9:1 to 1.1:1. It will be understood that this formula includes species in which one or more protons are transferred from the polyphosphate group to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, and g has an average value of greater than 2 to about 10,000, specifically about 5 to about 1,000, more specifically about 10 to about 500. In some embodiments in which the nitrogen-containing flame retardant is melamine polyphosphate, and g has an average value of greater than 2 to about 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al. In some embodiments, the nitrogen-containing flame retardant is melamine cyanurate (CAS Reg. No. 37640-57-6).

The nitrogen-containing flame retardant can have a low volatility relative to temperatures used to melt blend the composition. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations thereof. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include magnesium hydroxide (for example, CAS No. 1309-42-8), aluminum hydroxide (for example, CAS No. 21645-51-2), cobalt hydroxide (for example, CAS No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, e.g., a metal hydroxide exhibiting a weight loss of less than 1 weight percent upon drying at 120° C. for 1 hour. In some embodiments the metal hydroxide can be coated, for example, with stearic acid or other fatty acid.

The composition can comprise a flame retardant amount of about 10 to about 25 weight percent, specifically about 12 to about 20 weight percent, more specifically about 12 to about 18 weight percent, based on the total weight of the composition.

Another melt-blended component is a polymeric flame retardant synergist selected from the group consisting of poly (arylene ether)s, poly(arylene ether)-polysiloxane block copolymers, and mixtures thereof. As used herein, the term "poly(arylene ether)" is chemically distinct from the term "poly(arylene ether)-polysiloxane block copolymer". The term "poly(arylene ether)" refers to a polymer comprising a plurality of arylene ether units and excluding siloxane units, whereas the term "poly(arylene ether)-polysiloxane block copolymer" refers to a block copolymer requiring siloxane units in the form of a polysiloxane block.

The polymeric flame retardant synergist can be a poly (arylene ether). The poly(arylene ether) comprises repeating structural units of the formula

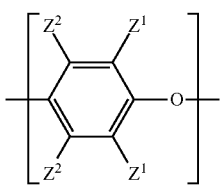

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise aminoalkyl-substituted groups, typically located in an ortho position relative to an ether oxygen group or a terminal hydroxy group. Also frequently present are 2,6-dimethyl-4-(3,5-dimethyl-4-hydroxyphenyl)phenoxy end groups, typically obtained from reaction mixtures in which 2,2',6,6'-tetramethyldiphenoquinone by-product is present.

The poly(arylene ether) can be in the form of a homopolymer; a copolymer; a graft copolymer; an ionomer; or a block copolymer; as well as combinations comprising at least one of the foregoing. Poly(arylene ether)s include those comprising 2,6-dimethyl-1,4-phenylene ether units, optionally in combination with 2,3,6-trimethyl-1,4-phenylene ether units. In some embodiments, the poly(arylene ether) consists of poly(2,6-dimethyl-1,4-phenylene ether). In this context, the term "consists of" excludes the reaction products of poly (arylene ether)s and functionalizing agents, such as acid-functionalized poly(arylene ether)s and anhydride-functionalized poly(arylene ether)s.

The poly(arylene ether) can be prepared by the oxidative coupling of monohydric phenols, such as 2,6-dimethylphenol and/or 2,3,6-trimethylphenol. Catalyst systems are generally employed for such coupling. They can contain heavy metal compound(s) such as a copper, manganese or cobalt compound, usually in combination with various other materials such as a secondary amine, tertiary amine, halide or combination of two or more of the foregoing.

In some embodiments, the poly(arylene ether) has a number average molecular weight of 3,000 to 40,000 atomic mass units and/or a weight average molecular weight of about 5,000 to about 80,000 atomic mass units, as determined by gel permeation chromatography using monodisperse polystyrene standards, a styrene divinyl benzene gel at 40° C. and samples having a concentration of 1 milligram per milliliter of chloroform. The poly(arylene ether) can have an initial intrinsic viscosity of 0.10 to 0.60 deciliters per gram (dl/g), or, more specifically, 0.29 to 0.48 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art, the viscosity of the poly(arylene ether) may be up to 30% higher after melt mixing. The percentage of increase can be calculated as 100×(final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

Suitable poly(arylene ether)s include those characterized by a weight average molecular weight and a peak molecular weight, wherein a ratio of the weight average molecular weight to the peak molecular weight is about 1.3:1 to about 4:1. These poly(arylene ether)s and methods for their preparation are described in copending U.S. Provisional Patent Application Ser. No. 61/224,936, filed Jul. 13, 2009. Suitable poly(arylene ether)s further include poly(2,6-dimethyl-1,4-phenylene ether)s, wherein a purified sample of poly(2,6-dimethyl-1,4-phenylene ether) prepared by dissolution of the as-synthesized poly(2,6-dimethyl-1,4-phenylene ether) in toluene, precipitation from methanol, reslurry, and isolation has a monomodal molecular weight distribution in the molecular weight range of 250 to 1,000,000 atomic mass units and comprises less than or equal to 2.2 weight percent of poly(2,6-dimethyl-1,4-phenylene ether) having a molecular weight more than fifteen times the number average molecular weight of the entire purified sample. When the purified sample is separated into six equal poly(2,6-dimethyl-1,4-phenylene ether) weight fractions of decreasing molecular weight, it comprises a first, highest molecular weight fraction comprising at least 10 mole percent of poly(2,6-dimethyl-1, 4-phenylene ether) comprising a terminal morpholine-substituted phenoxy group. These poly(arylene ether)s and their preparation are described in copending U.S. Nonprovisional patent application Ser. No. 12/495,980 filed Jul. 1, 2008.

The polymeric flame retardant synergist can comprise a poly(arylene ether)-polysiloxane block copolymer. As used herein, the term "poly(arylene ether)-polysiloxane block copolymer" refers to a block copolymer comprising at least one poly(arylene ether) block and at least one polysiloxane block.

In some embodiments, the poly(arylene ether)-polysiloxane block copolymer is prepared by an oxidative copolymerization method. In this method, the poly(arylene ether)-polysiloxane block copolymer is the product of a process comprising oxidatively copolymerizing a monomer mixture comprising a monohydric phenol and a hydroxyaryl-terminated polysiloxane. This synthetic approach is most conducive to preparing block copolymers with relatively low polysiloxane contents. Thus, in some embodiments, the monomer mixture comprises about 90 to about 99 parts by weight of the monohydric phenol and about 1 to about 10 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

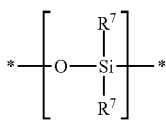

wherein each occurrence of $R^7$ is independently hydrogen, $C_1$-$C_{12}$ hydrocarbyl or $C_1$-$C_{12}$ halohydrocarbyl; and two terminal units having the structure

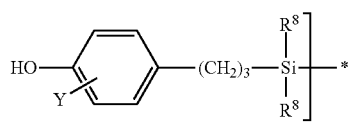

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl. In an alternative embodiment, the hydroxyaryl-terminated polysiloxane is a hydroxyaryl-monoterminated polysiloxane having the structure described above but comprising only one of the terminal units.

In some embodiments, the monohydric phenol comprises 2,6-dimethylphenol, and the hydroxyaryl-terminated polysiloxane has the structure

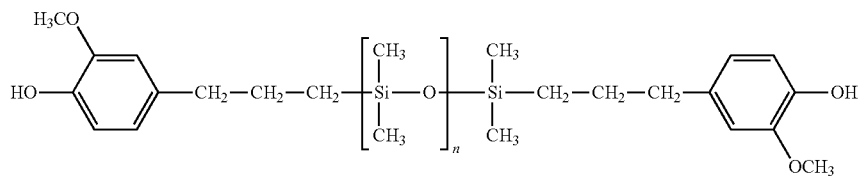

wherein n is, on average, about 5 to about 100, specifically about 35 to about 80, more specifically about 35 to about 60.

The oxidative polymerization of a mixture of monohydric phenol and a hydroxyaryl-terminated polysiloxane produces poly(arylene ether)-polysiloxane block copolymer as the desired product and poly(arylene ether) (without an incorporated polysiloxane block) as a by-product. It is not necessary to separate the poly(arylene ether) from the poly(arylene ether)-polysiloxane block copolymer. The poly(arylene ether)-polysiloxane block copolymer can thus be incorporated into the present composition as a "reaction product" that includes both the poly(arylene ether) and the poly(arylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(arylene ether)-polysiloxane block copolymer.

In some embodiments, the poly(arylene ether)-polysiloxane block copolymer is provided in the form of a poly(arylene ether)-polysiloxane block copolymer reaction product comprising a poly(arylene ether) and a poly(arylene ether)-polysiloxane block copolymer. The poly(arylene ether)-polysiloxane block copolymer can comprise a poly(arylene ether) block, and a polysiloxane block comprising, on average, about 35 to about 80 siloxane repeating units. The poly(arylene ether)-polysiloxane block copolymer reaction product can comprise about 1 to about 8 weight percent siloxane repeating units and 92 to 99 weight percent arylene ether repeating units. The poly(arylene ether)-polysiloxane block copolymer reaction product can have a weight average molecular weight of at least 30,000 atomic mass units.

When the poly(arylene ether)-polysiloxane block copolymer is provided in the form of a poly(arylene ether)-polysiloxane block copolymer reaction product, that reaction product includes comprises a poly(arylene ether). The poly(arylene ether) is the product of polymerizing the monohydric phenol alone and is a by-product of the block copolymer synthesis. When the monohydric phenol consists of a single compound (for example, 2,6-dimethylphenol), the poly(arylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(arylene ether) is the product of copolymerizing the two or more distinct monohydric phenol species. Using the nuclear magnetic resonance methods described in the working examples, it has not been possible to allocate the arylene ether residues between poly(arylene ether) and poly(arylene ether)-polysiloxane block copolymer. However, the presence of poly(arylene ether) is inferred from the detection and quantification of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

When the poly(arylene ether)-polysiloxane block copolymer is provided in the form of a poly(arylene ether)-polysiloxane block copolymer reaction product, it comprises a poly(arylene ether)-polysiloxane block copolymer. The poly(arylene ether)-polysiloxane block copolymer comprises a poly(arylene ether) block and a polysiloxane block. The poly(arylene ether) block is a residue of the polymerization of the monohydric phenol. In some embodiments, the poly(arylene ether) block comprises arylene ether repeating units having the structure

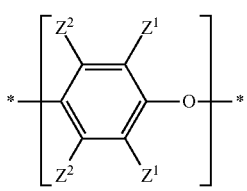

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it may, optionally, contain heteroatoms over and above the carbon and hydrogen members of the substituent residue. Thus, when specifically described as substituted, the hydrocarbyl residue may also comprise one or more substituents such as halogen (including fluorine, chlorine, bromine, and iodine), carboxylic acid groups, amino groups, hydroxyl groups, or the like, or it may contain divalent heteroatoms-containing groups such as oxygen atoms, silicon atoms, and carbonyl groups within the backbone of the hydrocarbyl residue. In some embodiments, the poly(arylene ether) block comprises 2,6-dimethyl-1,4-phenylene ether repeating units, that is, repeating units having the structure

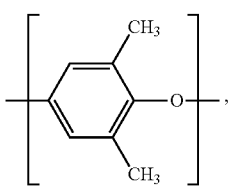

or 2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

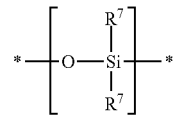

wherein each occurrence of $R^7$ is independently hydrogen, $C_1$-$C_{12}$ hydrocarbyl or $C_1$-$C_{12}$ halohydrocarbyl; and the polysiloxane block further comprises a terminal unit having the structure

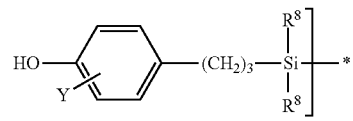

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl. In some embodiments, each occurrence of $R^8$ is independently $C_1$-$C_6$ alkyl, specifically $C_1$-$C_3$ alkyl, more specifically methyl. In some embodiments, the polysiloxane repeating units comprise dimethylsiloxane ($-Si(CH_3)_2O-$) units. In some embodiments, the polysiloxane block has the structure

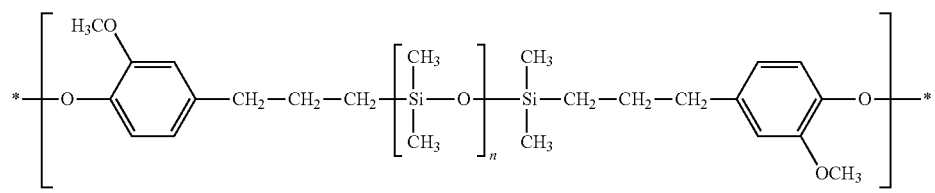

wherein n is about 5 to about 100, specifically about 35 to about 80, more specifically about 35 to about 60.

In some embodiments, the poly(arylene ether) block comprises arylene ether repeating units having the structure

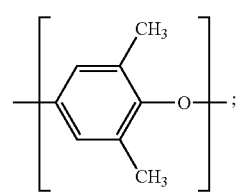

and the polysiloxane block has the structure

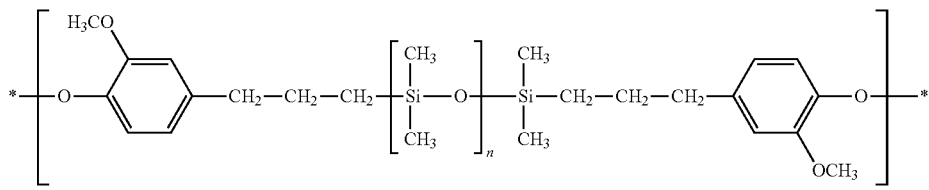

wherein n is 35 to 60; and the poly(arylene ether)-polysiloxane block copolymer reaction product has a number average molecular weight of 10,000 to 30,000 atomic mass units.

The hydroxyaryl-terminated polysiloxane comprises at least one hydroxyaryl terminal group. In some embodiments, the hydroxyaryl-terminated polysiloxane has a single hydroxyaryl terminal group, in which case a poly(arylene ether)-polysiloxane diblock copolymer is formed. In other embodiments, the hydroxyaryl-terminated polysiloxane has two hydroxyaryl terminal groups, in which case in which case poly(arylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block can comprise, on average, about 5 to about 100 siloxane repeating units. Within this range, the number of siloxane repeating units can be about 35 to about 80, specifically about 35 to about 60, more specifically about 40 to about 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

When prepared by the oxidative copolymerization method, the poly(arylene ether)-polysiloxane block copolymer reaction product can comprise about 1 to about 8 weight percent siloxane repeating units and 92 to 99 weight percent arylene ether repeating units, based on the total weight of the poly (arylene ether)-polysiloxane block copolymer reaction product. Within these ranges, the weight percent of siloxane repeating units can be about 3 to about 7 weight percent, specifically about 4 to about 6 weight percent, more specifically about 4 to about 5 weight percent; and the weight percent arylene ether repeating units can be about 93 to about 97 weight percent, specifically about 94 to about 96 weight percent, more specifically about 95 to about 96 weight percent.

When prepared by the oxidative copolymerization method, the poly(arylene ether)-polysiloxane block copolymer reaction product can have a weight average molecular weight of at least about 30,000 atomic mass units. In some embodiments the weight average molecular weight is about 30,000 to about 150,000 atomic mass units, specifically about 35,000 to about 120,000 atomic mass units, more specifically about 40,000 to about 90,000 atomic mass units, even more specifically about 45,000 to about 70,000 atomic mass units. In some embodiments, the poly(arylene ether)-polysiloxane block copolymer reaction product has a number average molecular weight of about 10,000 to about 50,000 atomic mass units, specifically about 10,000 to about 30,000 atomic mass units, more specifically about 14,000 to about 24,000 atomic mass units. A detailed chromatographic method for determining molecular weight is described in the working examples below.

When prepared by the oxidative copolymerization method, the poly(arylene ether)-polysiloxane block copolymer reaction product can include relatively small amounts of very low molecular weight species. Thus, in some embodiments, the poly(arylene ether)-polysiloxane block copolymer reaction product comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the poly(arylene ether)-polysiloxane block copolymer reaction product can also include relatively small amounts of very high molecular weight species. Thus, in some embodiments, the poly(arylene ether)-polysiloxane block copolymer reaction product comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the poly(arylene ether)-polysiloxane block copolymer reaction product has an intrinsic viscosity of at least about 0.3 deciliter per gram, as measured at 25° C. in chloroform. The intrinsic viscosity can be about 0.3 to about 0.6 deciliter pre gram, specifically about 0.3 to about 0.5 deciliter per gram, still more specifically about 0.31 to about 0.55 deciliter per gram, yet more specifically about 0.35 to about 0.47 deciliter per gram.

One indication of the efficiency with which the oxidative copolymerization method incorporates the hydroxyaryl-terminated polysiloxane into the block copolymer is the low concentration of so-called poly(arylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly (arylene ether) tail group has the structure

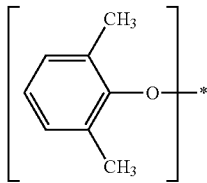

wherein the 3-, 4-, and 5-positions of the ring are substituted with hydrogen atoms (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. When the monohydric phenol consists of 2,6-dimethylphenol, and particularly when the poly(arylene ether)-polysiloxane block copolymer reaction product is the sole source of arylene ether units in the composition, the composition can comprise less than or equal to 0.4 weight percent, specifically 0.2 to 0.4 weight percent, of 2,6-dimethylphenoxy groups, based on the weight of the composition. When the monohydric phenol consists of 2,6-dimethylphenol, and particularly when the composition comprises poly(arylene ether) in addition to that present in the poly(arylene ether)-polysiloxane block copolymer reaction product, the composition can comprise less than or equal to 1 weight percent, specifically 0.2 to 1 weight percent, of 2,6-dimethylphenoxy groups, based on the weight of the composition.

The poly(arylene ether)-polysiloxane block copolymer reaction product can further include groups derived from a diphenoquinone, which is itself an oxidation product of the monohydric phenol. For example, when the monohydric phenol is 2,6-dimethylphenol, the poly(arylene ether)-polysiloxane block copolymer reaction product can comprise 1.1 to 2.0 weight percent of 2,6-dimethyl-4-(3,5-dimethyl-4-hydroxyphenyl)phenoxy groups.

The poly(arylene ether)-polysiloxane block copolymer reaction product can be isolated from solution by an isolation procedure that minimizes volatile and nonvolatile contaminants. For example, in some embodiments, the poly(arylene ether)-polysiloxane block copolymer reaction product comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the poly (arylene ether)-polysiloxane block copolymer reaction product comprises less than or equal to 100 parts per million by weight of the metal, specifically about 0.5 to 100 parts per million by weight of the metal, more specifically about 10 to about 50 parts per million by weight of the metal, even more specifically about 20 to about 50 parts per million by weight of the metal.

The poly(arylene ether)-polysiloxane block copolymer reaction product can be prepared by a method comprising oxidatively copolymerizing the monohydric phenol and the hydroxyaryl-terminated polysiloxane to form a poly(arylene ether)-polysiloxane block copolymer reaction product. The oxidative copolymerization can be initiated in the presence of at least 50 weight percent of the hydroxyaryl-terminated polysiloxane and less than or equal to 50 weight percent of the monohydric phenol. In some embodiments, the oxidative copolymerization is initiated in the presence of at least 80 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

The hydroxyaryl-terminated polysiloxane can comprise, on average, about 5 to about 100 siloxane repeating units. In some embodiments, the hydroxyaryl-terminated polysiloxane comprises, on average, about 35 to about 80 siloxane repeating units, specifically about 35 to about 60 siloxane repeating units, more specifically about 40 to about 50 siloxane repeating units. In some embodiments, the hydroxyaryl-terminated polysiloxane constitutes about 1 to about 8 weight percent, specifically about 3 to about 8 weight percent, of the combined weight of the monohydric phenol and the hydroxyaryl-terminated polysiloxane.

The oxidative copolymerization can be conducted with a reaction time greater than or equal to 110 minutes. The reaction time is the elapsed time between initiation and termination of oxygen flow. (Although, for brevity, the description herein repeatedly refers to "oxygen" or "oxygen flow", it will be understood that any oxygen-containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the product poly(arylene ether)-polysiloxane block copolymer reaction product can be isolated from solution using methods known in the art for isolating poly(arylene ether)s from solution. For example, the poly(arylene ether)-polysiloxane block copolymer reaction product can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the poly(arylene ether)-polysiloxane block copolymer reaction product can be isolated by direct isolation methods, including devolatilizing extrusion. In some embodiments, the composition comprises less than or equal to 1.5 weight percent of the hydroxyaryl-terminated polysiloxane, specifically less than or equal to 0.5 weight percent of the hydroxyaryl-terminated polysiloxane, based on the total weight of the composition. Precipitation of the poly(arylene ether)-polysiloxane block copolymer reaction product in isopropanol has been observed to be effective for separating hydroxyaryl-terminated polysiloxane from the reaction product.

In some embodiments, the poly(arylene ether)-polysiloxane block copolymer reaction product incorporates greater than 75 weight percent of the hydroxyaryl-terminated polysiloxane starting material into the poly(arylene ether)-polysiloxane block copolymer. Specifically, the amount of hydroxyaryl-terminated polysiloxane incorporated into the poly(arylene ether)-polysiloxane block copolymer can be at least 80 weight percent, more specifically at least 85 weight percent, still more specifically at least 90 weight percent, yet more specifically at least 95 weight percent.

In a very specific procedure for preparing the poly(arylene ether)-polysiloxane block copolymer reaction product, the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is initiated in the presence of at least 90 weight percent of the hydroxyaryl-terminated polysiloxane and 2 to 20 weight percent of the monohydric phenol; the oxidative copolymerization is conducted with a reaction time of 170 to 220 minutes; and the hydroxyaryl-terminated polysiloxane constitutes 2 to 7 weight percent of the combined weight of the monohydric phenol and the capped polysiloxane.

Additional details relating to the preparation, characterization, and properties of the poly(arylene ether)-polysiloxane block copolymer reaction product can be found in copending U.S. patent application Ser. No. 12/277,835, filed Nov. 25, 2008.

In addition to the oxidative copolymerization method described above, a polyesterification method can be used to form the poly(arylene ether)-polysiloxane block copolymer. When the polyesterification method is used, the product is a multiblock copolymer comprising at least two poly(arylene ether) blocks and at least two polysiloxane blocks. Thus, in some embodiments, the poly(arylene ether)-polysiloxane block copolymer comprises a poly(arylene ether)-polysiloxane multiblock copolymer that is the product of copolymerizing a hydroxy-diterminated poly(arylene ether), a hydroxyaryl-diterminated polysiloxane, and an aromatic diacid chloride.

The hydroxy-diterminated poly(arylene ether) can have the structure

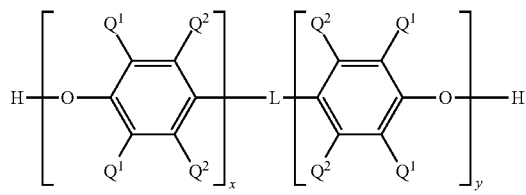

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

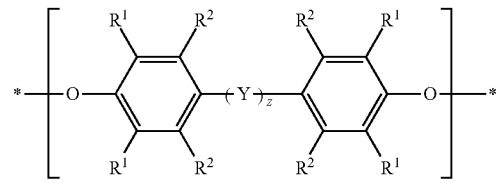

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

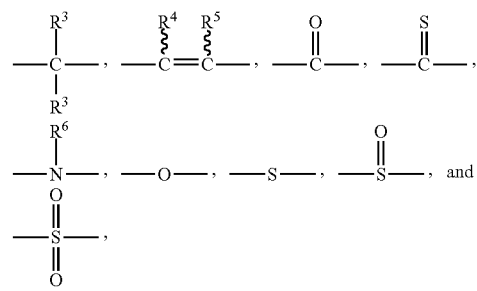

wherein each occurrence of $R^3$-$R^6$ is independently hydrogen or $C_1$-$C_{12}$ hydrocarbyl.

In some embodiments, the hydroxy-diterminated poly(arylene ether) has the structure

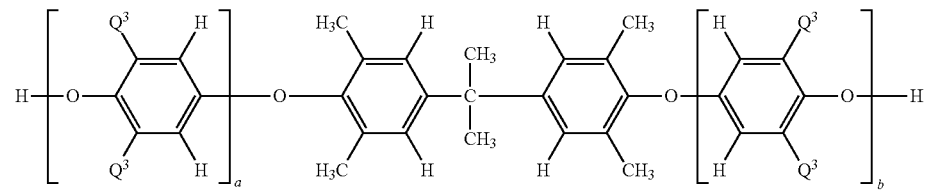

wherein each occurrence of $Q^3$ is independently methyl or di-n-butylaminomethyl; and each occurrence of a and b is independently 0 to about 100, provided that the sum of a and b is, on average, about 3 to about 100. In some embodiments, the sum of a and b is, on average, about 4 to about 30.

The aromatic diacid chloride used in the polyesterification method can be, for example, terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, or a mixture thereof. In some embodiments, the aromatic diacid chloride comprises terephthaloyl chloride.

As noted above, when the poly(arylene ether)-polysiloxane multiblock copolymer is prepared by the polyesterification method, it comprises at least two poly(arylene ether) blocks and at least two polysiloxane blocks. However, it can contain many more of each type of block. For example, in some embodiments, the poly(arylene ether)-polysiloxane multiblock copolymer comprises about 5 to about 25 poly(arylene ether) blocks and about 10 to about 30 polysiloxane blocks. The polyesterification method can, optionally, further include capping of any residual terminal hydroxy groups in the poly(arylene ether)-polysiloxane multiblock copolymer. By capping is meant the replacement of a terminal hydroxy group with an ether group, an ester group, a urethane group, or the like. For example, an ester capped multiblock copolymer can be formed by reacting the multiblock copolymer with at least one mole of benzoyl chloride per mole of hydroxy groups.

Additional details relating to the polyesterification method and the poly(arylene ether)-polysiloxane multiblock copolymer prepared thereby can be found in copending U.S. patent application Ser. No. 12/644,144 filed Dec. 22, 2009.

In some embodiments, the polymeric flame retardant synergist comprises a nitrogen content (as atomic nitrogen) of at least about 100 parts per million by weight, specifically about 100 to about 1,000 parts per million by weight. This nitrogen content is typically provided by incorporation of dialkylamino groups derived from a dialkylamine component of the polymerization catalyst. A nitrogen content at least about 100 parts per million by weight facilitates compatibilization of the polymeric flame retardant synergist with the polyamide.

The composition comprises about 5 to about 30 weight percent of the polymeric flame retardant synergist. Within this range, the polymeric flame retardant synergist amount can be about 10 to about 27 weight percent, specifically about 12 to about 24 weight percent. In some embodiments, the composition comprises about 10 to about 25 weight percent of the poly(arylene ether)-polysiloxane block copolymer.

In some embodiments, the composition comprises the poly(arylene ether)-polysiloxane block copolymer, and the poly(arylene ether)-polysiloxane block copolymer provides about 0.5 to about 2 weight percent polysiloxane to the composition. Within this range, the polysiloxane amount contributed by the poly(arylene ether)-polysiloxane block copolymer can be about 0.7 to about 1.5 weight percent, specifically about 0.2 to about 1.2 weight percent. Even when the poly(arylene ether)-polysiloxane block copolymer is present, the composition can comprise a very low level of free siloxane. For example, in some embodiments, the composition comprises less than or equal to 0.05 weight percent free polysiloxane. As used herein, the term "free polysiloxane" includes hydroxyaryl-terminated polysiloxane and hydroxyaryl-diterminated polysiloxanes but does not include polysiloxane blocks covalently bound to a poly(arylene ether) block.

In addition to the polyamide, the flame retardant, and the polymeric flame retardant synergist, the composition can, optionally, further include glass fibers. Suitable glass fibers include those having a diameter of about 7 to about 20 micrometers, specifically about 10 to about 15 micrometers. The glass fibers can comprise a coating (also known as sizing) to improve their compatibility with the polyamide. In some embodiments, the composition comprises about 2 to about 40 weight percent glass fibers, specifically about 5 to about 35 weight percent glass fibers, more specifically about 10 to about 30 weight percent glass fibers. In some embodiments, the composition comprises about 5 to about 15 weight percent glass fibers, specifically about 8 to about 12 weight percent glass fibers. In some embodiments, the composition comprises about 20 to about 40 weight percent glass fibers, specifically about 25 to about 35 weight percent glass fibers, more specifically about 25 to about 30 weight percent glass fibers.

The composition can, optionally, comprise less than or equal to 1 weight percent of any polymer other than the polyamide and the polymeric flame retardant. The amount of such other polymers can be less than or equal to 0.5 weight percent, specifically less than or equal to 0.1 weight percent, based on the total weight of the composition. The other polymers can also be excluded from the composition. Other polymers that can be individually or collectively minimized or excluded include, for example, homopolymers of alkenyl aromatic monomers (such as homopolystyrene), poly(phenylene sulfide)s, hydrogenated block copolymers of an alkenyl aromatic and a conjugated diene (e.g., polystyrene-poly(ethylene-butylene)-polystyrene triblock copolymer or SEBS), unhydrogenated block copolymers of an alkenyl aromatic and a conjugated diene (e.g., polystyrene-polybutadiene-polystyrene triblock copolymer or SBS), and rubber-modified polystyrenes (e.g., high-impact polystyrenes or HIPS).

In some embodiments, the composition comprises less than or equal to 1 weight percent of any halogenated material other than the brominated polystyrene. For example, in some embodiments, the polymeric flame retardant synergist is halogen-free.

A compatibilizing agent can be added to facilitate compatibilization of the polyamide with the polymeric flame retardant synergist. When present, the compatibilizing agent can be used in an amount that will vary according to the compatibilizing agent type, but amounts are typically about 0.1 to about 1 weight percent, based on the total weight of the composition. Within this range, the compatibilizing agent amount can be about 0.2 to about 0.8 weight percent, specifically about 0.3 to about 0.6 weight percent. As used herein, the expression "compatibilizing agent" refers to a polyfunctional compound that interacts with the poly(arylene ether), the polyamide, or both. This interaction may be chemical (for example, grafting) and/or physical (for example, affecting the surface characteristics of the dispersed phases). In either instance the resulting compatibilized poly(arylene ether)/polyamide composition exhibits improved compatibility, particularly as evidenced by enhanced impact strength, mold knit line strength, and/or tensile elongation. As used herein, the expression "compatibilized poly(arylene ether)/polyamide blend" refers to poly(arylene ether)/polyamide compositions that have been physically and/or chemically compatibilized with an agent as discussed above, as well as poly(arylene ether)/polyamide compositions that are physically compatible without such agents, as taught, for example, in U.S. Pat. No. 3,379,792 to Finholt.

Examples of compatibilizing agents that may be employed include liquid diene polymers, epoxy compounds, oxidized polyolefin wax, quinones, organosilane compounds, polyfunctional compounds, functionalized poly(arylene ether), and combinations comprising at least one of the foregoing. Compatibilizing agents are further described in U.S. Pat. No. 5,132,365 to Gallucci and U.S. Pat. No. 6,593,411 to Koevoets et al., as well as U.S. Patent Application Publication No. US 2003/0166762 A1 of Koevoets et al.

In some embodiments, the compatibilizing agent comprises a polyfunctional compound. Polyfunctional compounds that may be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, t-ethylacrylic acid, pentenoic acid; decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing the —OH group(s) of the above unsaturated alcohols with —$NH_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula

$(R^IO)_mR'(COOR^{II})_n(CONR^{III}R^{IV})_s$ wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

Some polyamides require particular types of compatibilizing agents. For example, monomeric compatibilizing agents or monomeric compatibilizing agents reacted with poly (arylene ether) are useful with nylon 9T but polymeric compatibilizing agents are generally unsuccessful.

The foregoing compatibilizing agents may be added directly to the melt blend or pre-reacted with either or both of the polymeric flame retardant synergist and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the polymeric flame retardant synergist. It is believed that such pre-reacting may cause the compatibilizing agent to react with and functionalize the polymeric flame retardant synergist. For example, a poly(arylene ether) can be pre-reacted with citric acid and/or maleic anhydride to form a functionalized poly(arylene ether). As another example, a poly(arylene ether)-polysiloxane block copolymer can be pre-reacted with citric acid and/or maleic anhydride to form an functionalized poly(arylene ether)-polysiloxane block copolymer.

In some embodiments, the composition comprises an impact modifier. As used herein, an "impact modifier" refers to an elastomeric polymer or copolymer having a glass transition temperature less than or equal to 0° C., specifically less than or equal to −20° C. One type of impact modifier is a rubber-containing copolymer of acrylonitrile and an alkenyl aromatic monomer. Another type of impact modifier is a block copolymer of alkenyl aromatic compound and a conjugated diene. Such block copolymers include A-B diblock copolymers and A-B-A triblock copolymers having of one or two poly(alkenyl aromatic) blocks, A, which are typically polystyrene blocks, and a poly(conjugated diene) rubber block, B, which is typically a polyisoprene or polybutadiene block. The polyisoprene or polybutadiene block may be partially or completely hydrogenated. Mixtures of these diblock and triblock copolymers may also be used as well as mixtures of non-hydrogenated copolymers, partially hydrogenated copolymers, fully hydrogenated copolymers, radial teleblock copolymers, tapered block copolymers, and combinations of two or more of the foregoing.

Suitable A-B and A-B-A block copolymers include, for example, polystyrene-polybutadiene (SB), polystyrene-poly (ethylene-butylene) (SEB), polystyrene-poly(ethylene-butylene)-polystyrene (SEBS), polystyrene-poly(ethylene-propylene) (SEP), polystyrene-polyisoprene (SI), poly(alpha-methylstyrene)-polybutadiene, polystyrene-polybutadiene-polystyrene (SBS), polystyrene-poly(ethylene-propylene)- polystyrene (SEPS), polystyrene-polyisoprene-polystyrene (SIS), poly(alpha-methylstyrene)-polybutadiene-poly(alpha-methylstyrene), polystyrene-poly(ethylene-propylene-styrene)-polystyrene, and the like, and mixtures thereof. Such A-B and A-B-A block copolymers are available commercially from a number of sources, including Phillips Petroleum under the trademark SOLPRENE, Kraton Polymers under the trademark KRATON, Dexco under the trademark VECTOR, Asahi Kasai under the trademark TUFTEC, Total Petrochemicals under the trademarks FINAPRENE and FINACLEAR, Kuraray under the trademark SEPTON, and Chevron Phillips Chemical Company under the tradename K-RESIN.

In some embodiments, the impact modifier comprises polystyrene-poly(ethylene-butylene)-polystyrene, polystyrene-poly(ethylene-propylene), or a mixture thereof.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 weight percent, more specifically less than 3 weight percent, even more specifically less than 2 weight percent, based on the total weight of the block copolymer. When the impact modifier comprises a carboxylic acid moiety, the carboxylic acid moiety may be neutralized with an ion, preferably a metal ion such as zinc or sodium.

The impact modifier may be an alkylene-alkyl (meth)acrylate copolymer wherein the alkylene groups may have 2 to 6 carbon atoms, and the alkyl group of the alkyl (meth)acrylate may have 1 to 8 carbon atoms. This type of polymer can be prepared by copolymerizing an olefin, for example, ethylene and/or propylene, with various (meth)acrylate monomers and/or various maleic-based monomers. The fragment "(meth)acryl-" as used herein includes acryl- and methacryl-. Included within the term (meth)acrylate monomers are alkyl (meth)acrylate monomers as well as various (meth)acrylate monomers containing at least one of the aforementioned reactive moieties. In one embodiment, the copolymer is derived from ethylene, propylene, or mixtures of ethylene and propylene, as the alkylene component; butyl acrylate, hexyl acrylate, or propyl acrylate as well as the corresponding alkyl (methyl)acrylates, for the alkyl(meth)acrylate monomer component, with acrylic acid, maleic anhydride, glycidyl methacrylate or a combination thereof as monomers providing the additional reactive moieties (that is, carboxylic acid, anhydride, epoxy). Suitable impact modifiers of this type are commercially available from a variety of sources including those sold by DuPont under the tradenames ELVALOY PTW, SURLYN, and FUSABOND.

When present, the impact modifier can be used in an amount of about 5 to about 30 weight percent, based on the total weight of the composition.

In some embodiments the composition comprises an electrically conductive filler. The electrically conductive filler can comprise electrically conductive carbon black, carbon nanotubes, carbon fibers or a combination thereof. Electrically conductive carbon blacks are commercially available and are sold under a variety of trade names, including but not limited to S.C.F. (Super Conductive Furnace), E.C.F. (Electric Conductive Furnace), KETJENBLACK EC (available from Akzo Co., Ltd.), PRINTEX XE2B (available from Degussa), ENSACO 350G (available from Timcal), or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks can also have surface areas greater than 200 square meter per gram ($m^2/g$), or, more specifically, greater than 400 $m^2/g$, or, even more specifically, greater than 900 $m^2/g$ as determined by BET analysis. The electrically conductive carbon black can have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

Carbon nanotubes that can be used include single wall carbon nanotubes (SWNTs), multiwall carbon nanotubes (MWNTs), vapor grown carbon fibers (VGCF), and combinations comprising two or more of the foregoing.

Single wall carbon nanotubes (SWNTs) can be produced by laser-evaporation of graphite, carbon arc synthesis, or a high-pressure carbon monoxide conversion process (HIPCO) process. These SWNTs generally have a single wall comprising a graphene sheet with outer diameters of 0.7 to 2.4 nanometers (nm). The SWNTs can comprise a mixture of metallic SWNTs and semi-conducting SWNTs. Metallic SWNTs are those that display electrical characteristics similar to metals, while the semi-conducting SWNTs are those that are electrically semi-conducting. In some embodiments it is desirable to have the composition comprise as large a fraction of metallic SWNTs as possible. SWNTs can have aspect ratios of greater than or equal to 5, or, more specifically, greater than or equal to 100, or, even more specifically, greater than or equal to 1000. While the SWNTs are generally closed structures having hemispherical caps at each end of the respective tubes, it is envisioned that SWNTs having a single open end or both open ends can also be used. The SWNTs generally comprise a central portion, which is hollow, but can be filled with amorphous carbon.

In some embodiments the SWNTs comprise metallic nanotubes in an amount of greater than or equal to 1 weight percent, or, more specifically, greater than or equal to 20 weight percent, or, more specifically, greater than or equal to 30 weight percent, or, even more specifically greater than or equal to 50 weight percent, or, even more specifically, greater than or equal to 99.9 weight percent of the total weight of the SWNTs.

In one embodiment the SWNTs comprise semi-conducting nanotubes in an amount of greater than or equal to 1 weight percent, or, more specifically, greater than or equal to 20 weight percent, or, more specifically, greater than or equal to 30 weight percent, or, even more specifically, greater than or equal to 50 weight percent, or, even more specifically, greater than or equal to 99.9 weight percent of the total weight of the SWNTs.

MWNTs can be produced by processes such as laser ablation and carbon arc synthesis. MWNTs have at least two graphene layers bound around an inner hollow core. Hemispherical caps generally close both ends of the MWNTs, but it is also possible to use MWNTs having only one hemispherical cap or MWNTs which are devoid of both caps. MWNTs generally have diameters of 2 to 50 nm. Within this range, the MWNTs can have an average diameter less than or equal to 40, or, more specifically, less than or equal to 30, or, even more specifically less than or equal to 20 nm. MWNTs can have an average aspect ratio greater than or equal to 5, or, more specifically, greater than or equal to 100, or, even more specifically greater than or equal to 1000.

In some embodiments, the MWNT comprises vapor grown carbon fibers (VGCF). VGCF are generally manufactured in a chemical vapor deposition process. VGCF having "tree-ring" or "fishbone" structures can be grown from hydrocarbons in the vapor phase, in the presence of particulate metal catalysts at moderate temperatures, for example, 800 to 1500° C. In the "tree-ring" structure a multiplicity of substantially graphitic sheets are coaxially arranged about the core. In the "fishbone" structure, the fibers are characterized by graphite layers extending from the axis of the hollow core.

VGCF having diameters of 3.5 to 2000 nanometers (nm) and aspect ratios greater than or equal to 5 can be used. VGCF can have diameters of 3.5 to 500 nm, or, more specifically 3.5 to 100 nm, or, even more specifically 3.5 to 50 nm. VGCF can have an average aspect ratios greater than or equal to 100, or, more specifically, greater than or equal to 1000.

Various types of conductive carbon fibers can also be used in the composition. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of greater than or equal to 1,000 nanometers (1 micrometer) to 30 micrometers. Within this range fibers having sizes of greater than or equal to 2 micrometers, or, more specifically, greater than or equal to 3 micrometers, or, more specifically greater than or equal to 4 micrometers can be used. Also within this range fibers having diameters of less than or equal to 25 micrometers, or, more specifically, less than or equal to 15 micrometers, or, even more specifically less than or equal to 11 micrometers can be used.

The composition can comprise a sufficient amount of electrically conductive filler to achieve a specific volume resistivity less than or equal to $10^6$ ohm-centimeter. For example, the composition can comprise electrically conductive carbon black, carbon fibers, carbon nanotubes, or a combination of two or more of the foregoing in an amount of 0.3 to 20 weight percent. Within this range, the electrically conductive filler can be present in an amount greater than or equal to 0.5 weight percent, or, more specifically, in an amount greater than or equal to 0.7 weight percent, or, even more specifically, in an amount greater than or equal to 0.8 weight percent. Also within this range, the electrically conductive carbon filler can be present in an amount less than or equal to 15 weight percent, or, more specifically, less than or equal to 10 weight percent, or, even more specifically, less than or equal to 5 weight percent. Weight percent is based on the total weight of the thermoplastic composition.

In some embodiments it is desirable to incorporate a sufficient amount of electrically conductive filler to achieve a specific volume resistivity that is sufficient to permit the composition to dissipate electrostatic charges or to be thermally dissipative. In other embodiments, the composition excludes electrically conductive filler.

The composition can, optionally, further comprise various additives known in the thermoplastics art. For example, the composition can, optionally, further comprise an additive chosen from stabilizers, antioxidants, mold release agents, processing aids, drip retardants, nucleating agents, UV blockers, dyes, pigments, fragrances, anti-static agents, metal deactivators, antiblocking agents, and the like, and combinations thereof. A particularly useful additive is poly(styrene-acrylonitrile)-encapsulated poly(tetrafluoroethylene), which can be considered part of the flame retardant. When present, additives are typically used in a total amount of about 0.05 to 10 weight percent, based on the total weight of the composition.

In a very specific embodiment, the composition comprises the product of melt blending about 30 to about 40 weight percent of the polyamide, about 15 to about 30 weight percent of the flame retardant, and about 12 to about 25 weight percent of the polymeric flame retardant synergist; the polyamide comprises polyamide-6,6; the flame retardant comprises about 12 to about 25 weight percent of the brominated polystyrene; the flame retardant further comprises about 3 to about 8 weight percent of antimony trioxide; the polymeric flame retardant synergist comprises the poly(arylene ether)-polysiloxane block copolymer; and the composition further comprises about 20 to about 30 weight percent glass fibers. The composition can, optionally, further comprise about 0.05 to about 0.5 weight percent of a poly(styrene-acrylonitrile)-encapsulated poly(tetrafluoroethylene).

In a very specific embodiment, the composition comprises the product of melt blending about 30 to about 40 weight percent of the polyamide, about 15 to about 30 weight percent of the flame retardant, and about 12 to about 25 weight percent of the polymeric flame retardant synergist; the polyamide comprises polyamide-6,6; the flame retardant comprises about 12 to about 25 weight percent of the brominated polystyrene; the flame retardant further comprises about 3 to about 8 weight percent of antimony trioxide; the polymeric flame retardant synergist comprises the poly(arylene ether); and the composition further comprises about 20 to about 30 weight percent glass fibers. The composition can, optionally, further comprise about 0.05 to about 0.5 weight percent of a poly(styrene-acrylonitrile)-encapsulated poly(tetrafluoroethylene).

In a very specific embodiment, the composition comprises the product of melt blending about 35 to about 45 weight percent of the polyamide, about 15 to about 25 weight percent of the flame retardant, and about 10 to about 20 weight percent of the polymeric flame retardant synergist; the polyamide comprises polyamide-6,6; the flame retardant comprises about 15 to about 25 weight percent of the brominated polystyrene; the flame retardant further comprises less than or equal to 1 weight percent of antimony trioxide; the polymeric flame retardant synergist comprises the poly(arylene ether)-polysiloxane block copolymer; and the composition further comprises about 20 to about 30 weight percent glass fibers. The composition can, optionally, further comprise about 0.05 to about 0.5 weight percent of a poly(styrene-acrylonitrile)-encapsulated poly(tetrafluoroethylene).

The composition can exhibit good flame retardancy. For example, in some embodiments, the composition exhibits a flame retardancy rating of V-1 or V-0 at a thickness of 3 millimeters, measured according to Underwriter's Laboratory Bulletin 94, "Tests for Flammability of Plastic Materials, UL 94", Vertical Burning Flame Test. In some embodiments, the composition exhibits a flame retardancy rating of V-1 or V-0 at a thickness of 2 millimeters, measured according to Underwriter's Laboratory Bulletin 94, "Tests for Flammability of Plastic Materials, UL 94", Vertical Burning Flame Test. In some embodiments, the composition exhibits a flame retardancy rating of V-1 or V-0 at a thickness of 1 millimeter, measured according to Underwriter's Laboratory Bulletin 94, "Tests for Flammability of Plastic Materials, UL 94", Vertical Burning Flame Test.

Another embodiment is a method of forming a composition, comprising: melt blending about 30 to about 60 weight percent of a polyamide, a flame retardant comprising about 10 to about 25 weight percent brominated polystyrene, and about 5 to about 30 weight percent of a polymeric flame retardant synergist selected from the group consisting of poly(arylene ether)s, poly(arylene ether)-polysiloxane block copolymers, and mixtures thereof to form a composition; wherein all weight percent are based on the total weight of the composition. Within the range of about 30 to about 60 weight percent, the polyamide amount can be at least about 30 weight percent. Also within the range of about 30 to about 60 weight percent, the polyamide amount can be up to about 55 weight percent, specifically up to about 50 weight percent, more specifically up to about 45 weight percent, still more specifically up to about 40 weight percent. All of the compositional variations described above in the context of the composition apply as well to the method of forming the composition.

Melt blending is typically conducted at a temperature of about 270 to about 320° C., specifically about 280 to about 310° C., more specifically about 290 to about 300° C. Apparatus for melt blending is known in the art and includes, for example, Brabender mixers and extruders, including single-screw and twin-screw extruders.

In some embodiments, the method further comprises melt blending about 0.1 to about 1 weight percent of a compatibilizing agent with the polyamide, the flame retardant, and the polymeric flame retardant synergist. In some embodiments, the method further comprises blending the melt-blended polyamide, flame retardant, and polymeric flame retardant synergist, with glass fibers in an amount of about 2 to about 40 weight percent, or about 5 to about 15 weight percent, or about 20 to about 40 weight percent.

In some embodiments, the polymeric flame retardant synergist and the compatibilizing agent are melt blended with each other prior to melt blending with the polyamide and the brominated polystyrene.

In some embodiments, the polyamide and the flame retardant are melt blended with each other prior to melt blending with the polymeric flame retardant synergist and the compatibilizing agent.

In some embodiments, the polyamide and the flame retardant are further melt blended with about 0.05 to about 0.5 weight percent of a polystyrene-acrylonitrile)-encapsulated poly(tetrafluoroethylene) prior to melt blending with the polymeric flame retardant synergist and the compatibilizing agent.

Other embodiments include compositions prepared by any of the above-described methods.

Other embodiments include articles comprising any of the above-described compositions. Useful articles that can be prepared from the composition include electrical and automotive connectors, electrical devices such as switches, and electrical enclosures such as junction boxes, lighting enclosures, and sockets. Injection molding is a presently preferred method of forming articles from the composition.

The invention includes at least the following embodiments.

Embodiment 1: A composition comprising the product of melt blending: about 30 to about 60 weight percent of a polyamide; a flame retardant comprising about 10 to about 25 weight percent brominated polystyrene; and about 5 to about 30 weight percent of a polymeric flame retardant synergist selected from the group consisting of poly(arylene ether)s, poly(arylene ether)-polysiloxane block copolymers, and mixtures thereof; wherein all weight percent are based on the total weight of the composition.

Embodiment 2: The composition of embodiment 1, wherein the brominated polystyrene comprises an average of about 2 to about 4 bromine atoms per phenyl ring and less than or equal to 5 mole percent bromination of aliphatic carbon atoms.

Embodiment 3: The composition of embodiment 1 or 2, wherein the polymeric flame retardant synergist comprises the poly(arylene ether)-polysiloxane block copolymer.

Embodiment 4: The composition of embodiment 3, wherein the poly(arylene ether)-polysiloxane block copolymer is the product of a process comprising oxidatively copolymerizing a monomer mixture comprising a monohydric phenol and a hydroxyaryl-terminated polysiloxane.

Embodiment 5: The composition of embodiment 4, wherein the monomer mixture comprises about 90 to about 99 parts by weight of the monohydric phenol and about 1 to about 10 parts by weight of the hydroxyaryl-terminated polysiloxane, based on the total weight of the monohydric phenol and the hydroxyaryl-terminated polysiloxane.

Embodiment 6: The composition of embodiment 4 or 5, wherein the hydroxyaryl-terminated polysiloxane comprises a hydroxyaryl-diterminated polysiloxane comprising a plurality of repeating units having the structure

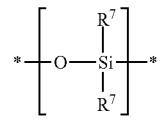

wherein each occurrence of $R^7$ is independently hydrogen, $C_1$-$C_{12}$ hydrocarbyl or $C_1$-$C_{12}$ halohydrocarbyl; and two terminal units having the structure

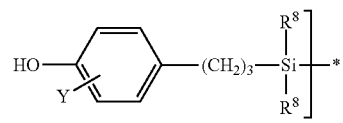

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl.

Embodiment 7: The composition of any of embodiments 4-6, wherein the monohydric phenol comprises 2,6-dimethylphenol, and the hydroxyaryl-terminated polysiloxane has the structure

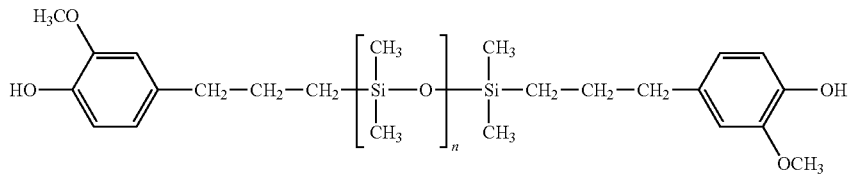

wherein n is, on average, about 5 to about 100.

Embodiment 8: The composition of any of embodiments 3-7, comprising about 10 to about 25 weight percent of the poly(arylene ether)-polysiloxane block copolymer.

Embodiment 9: The composition of any of embodiments 3-8, wherein the poly(arylene ether)-polysiloxane block copolymer provides about 0.5 to about 2 weight percent polysiloxane to the composition.

Embodiment 10: The composition of any of embodiments 1-9, comprising less than or equal to 0.05 weight percent free polysiloxane.

Embodiment 11: The composition of any of embodiments 1-10, further comprising about 2 to about 40 weight percent glass fibers.

Embodiment 12: The composition of any of embodiments 1-11, further comprising about 5 to about 15 weight percent glass fibers.

Embodiment 13: The composition of any of embodiments 1-11, further comprising about 20 to about 40 weight percent glass fibers.

Embodiment 14: The composition of any of embodiments 1-13, comprising less than or equal to 1 weight percent of any polymer other than the polyamide and the polymeric flame retardant.

Embodiment 15: The composition of any of embodiments 1-14, comprising less than or equal to 1 weight percent of any halogenated material other than the brominated polystyrene.

Embodiment 16: The composition of any of embodiments 1-15, wherein the polymeric flame retardant synergist is halogen-free.

Embodiment 17: The composition of any of embodiments 1-16, wherein the flame retardant further comprises about 1 to about 10 weight percent antimony trioxide.

Embodiment 18: The composition of embodiment 17, wherein the flame retardant further comprises about 0.05 to about 0.5 weight percent of a poly(styrene-acrylonitrile)-encapsulated poly(tetrafluoroethylene).

Embodiment 19: The composition of any of embodiments 1-18, further comprising the product of melt blending about 0.1 to about 1 weight percent of a compatibilizing agent with the polyamide, the brominated polystyrene, and the polymeric flame retardant synergist.

Embodiment 20: The composition of embodiment 1, wherein the composition comprises the product of melt blending about 30 to about 40 weight percent of the polyamide, about 15 to about 30 weight percent of the flame retardant, and about 12 to about 25 weight percent of the polymeric flame retardant synergist; wherein the polyamide comprises polyamide-6,6; wherein the flame retardant comprises about 12 to about 25 weight percent of the brominated polystyrene; wherein the flame retardant further comprises about 3 to about 8 weight percent of antimony trioxide; wherein the polymeric flame retardant synergist comprises the poly(arylene ether)-polysiloxane block copolymer; and wherein the composition further comprises about 20 to about 30 weight percent glass fibers.

Embodiment 21: The composition of embodiment 20, wherein the flame retardant further comprises about 0.05 to about 0.5 weight percent of a poly(styrene-acrylonitrile)-encapsulated poly(tetrafluoroethylene).

Embodiment 22: The composition of embodiment 1, wherein the composition comprises the product of melt blending about 30 to about 40 weight percent of the polyamide, about 15 to about 30 weight percent of the flame retardant, and about 12 to about 25 weight percent of the polymeric flame retardant synergist; wherein the polyamide comprises polyamide-6,6; wherein the flame retardant comprises about 12 to about 25 weight percent of the brominated polystyrene; wherein the flame retardant further comprises about 3 to about 8 weight percent of antimony trioxide; wherein the polymeric flame retardant synergist comprises the poly(arylene ether); and wherein the composition further comprises about 20 to about 30 weight percent glass fibers.

Embodiment 23: The composition of embodiment 22, wherein the flame retardant further comprises about 0.05 to about 0.5 weight percent of a poly(styrene-acrylonitrile)-encapsulated poly(tetrafluoroethylene).

Embodiment 24: The composition of any of embodiments 1-23, exhibiting a flame retardancy rating of V-1 or V-0 at a thickness of 3 millimeters, measured according to Underwriter's Laboratory Bulletin 94, "Tests for Flammability of Plastic Materials, UL 94", Vertical Burning Flame Test.

Embodiment 25: The composition of any of embodiments 1-24, exhibiting a flame retardancy rating of V-1 or V-0 at a thickness of 2 millimeters, measured according to Underwriter's Laboratory Bulletin 94, "Tests for Flammability of Plastic Materials, UL 94", Vertical Burning Flame Test.

Embodiment 26: The composition of any of embodiments 1-25, exhibiting a flame retardancy rating of V-1 or V-0 at a thickness of 1 millimeter, measured according to Underwriter's Laboratory Bulletin 94, "Tests for Flammability of Plastic Materials, UL 94", Vertical Burning Flame Test.

Embodiment 27: The composition of embodiment 1, wherein the composition comprises the product of melt blending about 35 to about 45 weight percent of the polyamide, about 15 to about 25 weight percent of the flame retardant, and about 10 to about 20 weight percent of the polymeric flame retardant synergist; wherein the polyamide comprises polyamide-6,6; wherein the flame retardant comprises about 15 to about 25 weight percent of the brominated polystyrene; wherein the flame retardant further comprises less than or equal to 1 weight percent of antimony trioxide; wherein the polymeric flame retardant synergist comprises the poly(arylene ether)-polysiloxane block copolymer; and wherein the composition further comprises about 20 to about 30 weight percent glass fibers.

Embodiment 28: The composition of embodiment 27, wherein the flame retardant further comprises about 0.05 to about 0.5 weight percent of a poly(styrene-acrylonitrile)-encapsulated poly(tetrafluoroethylene).

Embodiment 29: An article comprising the composition of any of embodiments 1-28.

Embodiment 30: A method of forming a composition, comprising: melt blending about 30 to about 60 weight percent of a polyamide, a flame retardant comprising about 10 to about 25 weight percent brominated polystyrene, and about 5 to about 30 weight percent of a polymeric flame retardant synergist selected from the group consisting of poly(arylene ether)s, poly(arylene ether)-polysiloxane block copolymers, and mixtures thereof to form a composition; wherein all weight percent are based on the total weight of the composition.

Embodiment 31: The method of embodiment 30, further comprising melt blending a about 0.1 to about 1 weight percent of a compatibilizing agent with the polyamide, the brominated polystyrene, and the polymeric flame retardant synergist.

Embodiment 32: The method of embodiment 31, wherein the polymeric flame retardant synergist and the compatibilizing agent are melt blended with each other prior to melt blending with the polyamide and the brominated polystyrene.

Embodiment 33: The method of embodiment 31, wherein the polyamide and the flame retardant are melt blended with each other prior to melt blending with the polymeric flame retardant synergist and the compatibilizing agent.

Embodiment 34: The method of embodiment 33, wherein the polyamide and the flame retardant are further melt blended with about 0.05 to about 0.5 weight percent of a poly(styrene-acrylonitrile)-encapsulated poly(tetrafluoroethylene) prior to melt blending with the polymeric flame retardant synergist and the compatibilizing agent.

The invention is further illustrated by the following non-limiting examples.

PREPARATIVE EXAMPLE 1

This example illustrates the preparation of a poly(arylene ether)-polysiloxane block copolymer by oxidative polymerization of 95 weight percent monohydric phenol in the presence of 5 weight percent of a hydroxyaryl-diterminated polysiloxane.

The process is summarized in Table 1, where "Toluene source" refers to whether the toluene solvent is fresh ("Fresh" in Table 1) or recycled ("Recyc." in Table 1) from a poly (arylene ether) homopolymer synthesis; "DMBA level (%)" is the concentration of dimethyl-n-butylamine, expressed as a weight percent relative to the weight of toluene; "Solids (%)" is the weight of total 2,6-dimethylphenol and eugenol-capped polysiloxane, expressed as a weight percent relative to the sum of the weights of 2,6-dimethylphenol, eugenol-capped polysiloxane, and toluene; "Polysiloxane chain length" is the average number of dimethylsiloxane ($—Si(CH_3)_2O—$) units in the eugenol-capped polysiloxane; "Polysiloxane loading (%)" is the weight percent of eugenol-capped polysiloxane in the reaction mixture, based on the total weight of the eugenol-capped polysiloxane and the 2,6-dimethylphenol; "Initial 2,6-dimethylphenol (%)" is the weight percent of 2,6-dimethylphenol present in the reaction vessel at the initiation of polymerization (the introduction of oxygen to the reaction vessel), relative to the total weight of 2,6-dimethylphenol; "O:2,6-dimethylphenol mole ratio" is the mole ratio of atomic oxygen (provided as molecular oxygen) to 2,6-dimethylphenol maintained during the addition of 2,6-dimethylphenol; "Temp., initial charge (° C.)" is the temperature, in degrees centigrade, of the reaction mixture when the initial charge of monomer is added to the reaction vessel, and when oxygen is first introduced to the reaction mixture; "Temp., addition (° C.)" is the reaction temperature during further addition of 2,6-dimethylphenol; "Temp., build (° C.)" is the temperature, expressed in degrees centigrade, during the build phase of the reaction; "Ramp time (min)" is the time, expressed in minutes, during which the temperature was ramped from the addition temperature to the build temperature; "Ramp slope (° C./min)" is the rate of change of temperature, expressed in degrees centigrade per minute, during the period in which the temperature was ramped from the addition temperature to the build temperature; "Reaction time (min)" is the total reaction time, expressed in minutes, elapsed between the moment of oxygen introduction and the moment of oxygen cut-off For all variations, controlled monomer addition time is 40 to 80 minutes from start of reaction (that is, the initiation of oxygen flow). Build time is measured from the end of controlled monomer addition to the end of reaction (that is, to the termination of oxygen flow); build time was about 80 to 160 minutes.

The following general synthetic procedure was used. The reactor and the 2,6-dimethylphenol addition tank were rinsed with warm toluene that was then discarded. The reaction was purged with nitrogen to achieve an oxygen concentration of less than 1%. The reactor was charged with initial toluene (fresh or recycled), and this toluene was stirred at 500 rotations per minute (rpm). The temperature of the initial toluene was adjusted to the "initial charge" temperature specified in Table 1 and maintained at that temperature during addition of the initial charge of 2,6-dimethylphenol from the addition tank to the reaction vessel. After the addition of the initial charge of 2,6-dimethylphenol was complete, the reaction vessel was charged with the eugenol-capped polydimethylsiloxane, the di-n-butylamine, the dimethyl-n-butylamine, the diamine, and the copper catalyst. Oxygen flow and further monomer addition were initiated, and the oxygen flow was regulated to maintain a head space concentration less than 17%. During further monomer addition, cooling water supply temperature was adjusted to maintain the temperature specified as "Temp., addition (° C.)" in Table 1. After monomer addition was complete, the monomer addition line was flushed with toluene and the reaction temperature was increased to the temperature specified as "Temp., build (° C.)" in Table 1. This temperature adjustment was conducted over the time period specified as "Ramp time (min)", and at the rate specified as "Ramp slope (° C./min)" in Table 1. The reaction was continued until a pre-determined time point was reached. The pre-determined end point is the time at which target intrinsic viscosity and maximum siloxane incorporation are attained and is typically 80 to 160 minutes after 2,6-dimethylphenyl addition ends. Once the time point was reached, the oxygen flow was stopped. The reaction mixture was then heated to 60° C. and pumped to a chelation tank containing aqueous chelant solution. The resulting mixture was stirred and held at 60° C. for one hour. The light (organic) and heavy (aqueous) phases were separated by decantation, and the heavy phase was discarded. A small portion of the light phase was sampled and precipitated with isopropanol for analysis, and the remainder of the light phase was pumped to a precipitation tank and combined with methanol antisolvent (for which isopropanol antisolvent can be substituted) in a weight ratio of 3 parts antisolvent to 1 part light phase. The precipitate was filtered to form a wet cake, which was reslurried three times with the same antisolvent and dried under nitrogen until a toluene concentration less than 1 weight percent was obtained.

Properties of resulting products are summarized in Table 1. "Total volatiles (%)", which is weight percent of volatiles in the isolated product, was determined by measuring the percent weight loss accompanying drying for 1 hour at 110° C. under vacuum; "Residual Cu (ppm)", which is the residual catalyst concentration expressed as parts per million by weight of elemental copper, was determined by atomic absorption spectroscopy; for properties as a function of reaction time, samples were removed from the reactor and precipitated (without prior chelation of catalyst metal) by addition of one volume of reaction mixture to three volumes of room temperature isopropanol to yield a precipitate that was filtered, washed with isopropanol, and dried prior to $^1H$ NMR (to determine weight percent siloxane and siloxane incorporation efficiency) and intrinsic viscosity analyses.

Number average molecular weight and weight average molecular weight were determined by gel permeation chromatography as follows. The gel permeation chromatograph is calibrated using eight polystyrene standards, each of narrow molecular weight distribution and collectively spanning a molecular weight range of 3,000 to 1,000,000 grams/mole. The columns used were 1e3 and 1e5 angstrom PLgel columns with a 5 microliter 100 angstrom PLgel guard column. Chromatography was conducted at 25° C. The elution liquid was chloroform with 100 parts per million by weight di-n-butylamine The elution flow was 1.2 milliliters per minute. The detector wavelength was 254 nanometers. A third degree polynomial function is fitted through the calibration points. Experimental samples are prepared by dissolving 0.27 grams isolated block copolymer solid in 45 milliliters toluene. A 50 microliter sample of the resulting solution is injected into the chromatograph. The values of number average molecular weight (MO and weight average molecular weight ($M_w$) are calculated from the measured signal using the polystyrene calibration line. The values are subsequently converted from polystyrene molecular weight to poly(2,6-dimethyl-1,4-phenylene ether) molecular weights using the equation M(PPE) =0.3122×M(PS)$^{1.073}$, where M(PPE) is poly(2,6-dimethyl-1,4-phenylene ether) molecular weight and M(PS) is polystyrene molecular weight.

In Table 1, "Mol. Wt. <10K (%)" is the weight percent of the isolated reaction product having a molecular weight less than 10,000 atomic mass units, as determined by gel permeation chromatography; "Mol. Wt. >100K (%)" is the weight percent of the isolated reaction product having a molecular weight less than 10,000 atomic mass units, as determined by gel permeation chromatography; "IV, end of rxn. (dL/g)" is the intrinsic viscosity, expressed in deciliters per gram and measured by Ubbelohde viscometer at 25° C. in chloroform, of dried powder isolated by precipitation from isopropanol; "IV, end of cheln. (dL/g)" is the intrinsic viscosity, expressed in deciliters per gram and measured by Ubbelohde viscometer at 25° C. in chloroform, of the product present in the post-chelation organic phase which has been isolated by precipitation from isopropanol then dried; "$M_w$, end of rxn. (AMU)" is the weight average molecular weight, expressed in atomic mass units and measured by gel permeation chromatography, of the product present in the reaction mixture at the end of the polymerization reaction which has been isolated by precipitation from isopropanol then dried; "$M_n$, end of rxn. (AMU)" is the number average molecular weight, expressed in atomic mass units and measured by gel permeation chromatography, of the product present in the reaction mixture at the end of the polymerization reaction which has been isolated by precipitation from isopropanol then dried; "$M_w/M_n$, end of rxn." is the ratio of weight average molecular weight to number average molecular weight for the product present in the reaction mixture at the end of the polymerization reaction which has been isolated by precipitation from isopropanol then dried; "$M_w$, end of cheln. (AMU)" is the weight average molecular weight, expressed in atomic mass units and measured by gel permeation chromatography, of the product present in the post-chelation organic phase which has been isolated by precipitation from isopropanol then dried; "$M_n$, end of cheln. (AMU)" is the number average molecular weight, expressed in atomic mass units and measured by gel permeation chromatography, of the product present in the post-chelation organic phase which has been isolated by precipitation from isopropanol then dried; "$M_w/M_n$, end of cheln." is the ratio of weight average molecular weight to number average molecular weight for the product present in the post-chelation organic phase which has been isolated by precipitation from isopropanol then dried.

In Table 1, "Weight % siloxane (%)" is the weight percent of dimethylsiloxane units in the isolated product, based on the total weight of 2,6-dimethyl-1,4-phenylene ether units and dimethylsiloxane units in the isolated product., as determined by $^1$H NMR using protons labeled a and b in the structure labeled "Formula (I)", below, and calculated as $$\text{Weight \% Siloxane\_in\_product} = \frac{X}{X+Y} \times 100$$

where $$X = \frac{\text{Peak "}b\text{" Integral@0.6 ppm} \times \text{Mn Siloxane Fluid}}{\text{proton per Siloxane Chain}},$$

and $$Y = \frac{\text{Peak "}a\text{" Integral@6.47 ppm} \times \text{MW 2,6 xylenol}}{2}$$

where "Mn Siloxane Fluid" in the equation for X is the number average molecular weight of the dimethylsiloxane units in the hydroxyaryl-terminated polysiloxane, and "MW2,6xylenol" in the equation for Y is the molecular weight of 2,6-dimethylphenol. Calling this metric "Weight % siloxane" is an oversimplification in that it neglects isolated product constituents other than the 2,6-dimethyl-1,4-phenylene ether units and dimethylsiloxane units. Nevertheless, it is a useful metric.

In Table 1, "Siloxane Incorporation Efficiency (%)" is the weight percent of dimethylsiloxane units in the isolated product compared to the weight percent of dimethylsiloxane units in the total monomer composition used in the reaction mixture (the precipitation from isopropanol removes unreacted (unincorporated) siloxane macromer), as determined by $^1$H NMR using protons labeled a and b in the structure labeled "Formula (I)", and calculated as $$\text{Siloxane\_Incorporation\_Efficiency\_(\%)} = \frac{\text{Weight \% Siloxane\_in\_product}}{\text{\% Siloxane Loaded}} \times 100$$

where the equation for Weight % Siloxane_in_product is given above, and $$\text{\% Siloxane Loaded} = \frac{\text{Weight of Siloxane Monomer Loaded}}{\text{Weight of Siloxane Monomer Loaded} + \text{Weight of 2,6 Monomer Loaded}} \times 100$$

where "Weight of Siloxane Monomer Loaded" is the weight of hydroxyaryl-terminated polysiloxane used in the reaction mixture, and "Weight of 2,6 Monomer Loaded" is the total weight of 2,6-dimethylphenol used in the reaction mixture. Calling this metric "Siloxane Incorporation Efficiency" is an oversimplification in that it neglects the possibility that small amounts of monomers and oligomers may be lost in the isolation process. For example, it is theoretically possible for the Siloxane Incorporation Efficiency to exceed 100% if all of the hydroxyaryl-terminated polysiloxane is incorporated into block copolymer, and some arylene ether oligomers are lost in the isolation procedure. Nevertheless, Siloxane Incorporation Efficiency is a useful metric.

In Table 1, "Tail (%)" refers to the percent of 2,6-dimethylphenol that are in an end group configuration compared to total 2,6-dimethylphenol residues and is determined by $^1$H NMR using the "tail" protons labeled e in the structure labeled "Formula (III)" below, and the protons labeled a in the structure labeled "Formula (I)" below, and calculated as $$\text{\% Tail} = \frac{Z}{Z+Y} \times 100$$

where the equation for Y is above, and $$Z = \frac{\text{Peak ``}e\text{'' Integral@7.09 ppm} \times \text{MW of 2,6 xylenol}}{3}.$$

In Table 2, "Biphenyl (%)" is the weight percent of 3,3',5,5'-tetramethyl-4,4'-biphenol residues, that is, residues having the structure

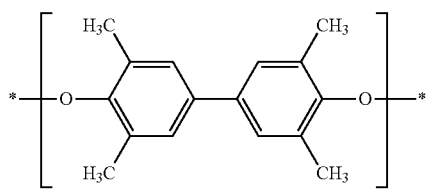

and is determined by $^1$H NMR using the "biphenyl" protons labeled d in the structure labeled "Formula (II)", below, and the protons labeled a in the structure labeled "Formula (I)", and calculated as $$\% \text{ Biphenyl} = \frac{W}{W+Y} \times 100$$

where the equation for Y is above, and $$W = \frac{\text{Peak ``}d\text{'' Integral@7.35 ppm} \times \text{MW biphenyl}}{4}$$

wherein "MW biphenyl" is the molecular weight of the residue of 3,3',5,5'-tetramethyl-4,4'-biphenol shown above.

"OH (ppm)" is the parts per million by weight of all hydroxyl groups, based on the total weight of the isolated sample, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$PNMR Spectroscopy", *Macromolecules*, volume 27, pages 6371-6375 (1994).

Formula (I)

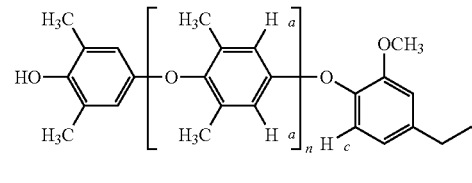

Formula (II)

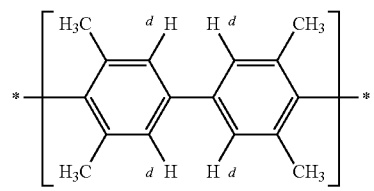

Formula (III)

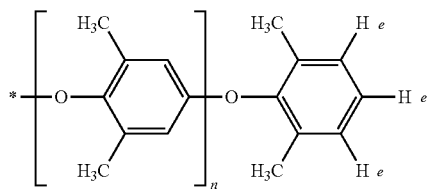

TABLE 1

|  | P. Ex. 1 |
| --- | --- |
| REACTION CONDITIONS | |
| Toluene Source | Recyc. |
| DMBA level (%) | 2.4 |
| Solids (%) | 23 |
| Polysiloxane chain length | 45 |
| Polysiloxane loading (%) | 5 |
| Initial 2,6-DMP (%) | 7.9 |
| O:2,6-DMP mole ratio | 0.98 |
| Catalyst (%) | 0.75 |
| Temp., initial charge (° C.) | 21 |
| Temp., addition (° C.) | 38 |
| Temp., build (° C.) | 49 |
| Ramp time (min) | 30 |
| Ramp slope (° C./min) | 0.37 |
| Reaction time (min) | 200 |
| FINAL PRODUCT PROPERTIES | |
| Mol. Wt. <10K (%) | 12 |
| Mol. Wt. >100K (%) | 12 |
| IV, end of rxn. (dL/g) | 0.40 |
| IV, end of cheln. (dL/g) | 0.36 |
| $M_w$, end of rxn. (AMU) | 58000 |
| $M_n$, end of rxn. (AMU) | 24000 |
| $M_w/M_n$, end of rxn. | 2.4 |
| $M_w$, end of cheln. (AMU) | 50000 |
| $M_n$, end of cheln. (AMU) | 19000 |
| $M_w/M_n$, end of cheln. | 2.6 |
| Weight % siloxane (%) | 4.77 |
| Silox. Incorp. Effic. (%) | 95 |

TABLE 1-continued

|  | P. Ex. 1 |
| --- | --- |
| Weight % Biphenyl (%) | 1.26 |
| Total OH (ppm) | 1532 |
| Total volatiles (%) | — |
| Residual Cu (ppm) | — |
| Wt. % siloxane, 80 min (%) | 0.17 |
| Wt. % siloxane, 110 min (%) | 3.67 |
| Wt. % siloxane, 200 min (%) | 4.64 |
| Silox. Incorp. Effic., 80 min (%) | 3.34 |
| Silox. Incorp. Effic., 110 min (%) | 73.33 |
| Silox. Incorp. Effic., 200 min (%) | 92.81 |
| IV, 80 min (dL/g) | 0.06 |
| IV, 110 min (dL/g) | 0.12 |
| IV, 200 min (dL/g) | 0.40 |

For characterization of the Preparative Example 1 composition as a function of molecular weight fraction, fractions from six gel permeation chromatography injections (36 mg of total material injected) were collected using a Gilson fraction collector. The effluent eluting between 12 and 25 minutes run time was divided into 60 test tubes which were later recombined to give 6 fractions with each contained approximately 16.67% of the total material (determined from area percent of the chromatogram). A small part (200 µl) of the five fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR. The results, presented in Table 4, show, first, that all fractions contain substantial dimethylsiloxane content. The fact that no "% tail" was detected in the highest molecular weight fraction indicates that this fraction is essentially free of poly(arylene ether) homopolymer; that is, it is essentially pure block copolymer. Similarly, the fact that the largest "% tail" was observed in the lowest molecular weight fraction means that the poly(arylene ether) is biased toward the lower molecular weight fractions.

TABLE 2

| Sample description | Siloxane weight (%) | Biphenyl weight (%) | Tail Weight (%) |
| --- | --- | --- | --- |
| Fraction 1 (83-100% of MW curve; highest MW fraction) | 4.39 | 0.56 | 0.00 |
| Fraction-02 (67-83% of MW curve) | 4.18 | 0.85 | 0.00 |
| Fraction-03 (50-67% of MW curve) | 4.34 | 0.87 | 0.00 |
| Fraction-04 (33-50% of MW curve) | 4.71 | 1.16 | 0.09 |
| Fraction-05 (17-33% of MW curve) | 5.27 | 1.61 | 0.19 |
| Fraction-06 (0-17% of MW curve; lowest Mw fraction) | 6.90 | 3.40 | 1.00 |

PREPARATIVE EXAMPLE 2

This example illustrates the preparation of a poly(arylene ether)-polysiloxane block copolymer by oxidative polymerization of 80 weight percent monohydric phenol in the presence of 20 weight percent of a hydroxyaryl-diterminated polysiloxane. The general procedure of Preparative Example 1 was followed, except that the monomer mixture contained 80 weight percent monohydric phenol in the presence of 20 weight percent of a hydroxyaryl-diterminated polysiloxane. Reaction conditions and product properties are summarized in Table 3.

TABLE 3

|  | P. Ex. 2 |
| --- | --- |
| REACTION CONDITIONS | |
| Toluene Source | Fresh |
| DMBA level (%) | 2 |
| Solids (%) | 23 |
| Polysiloxane chain length | 45 |
| Polysiloxane loading (%) | 20 |
| Initial 2,6-DMP (%) | 7.9 |
| O:2,6-DMP mole ratio | 0.98 |
| Catalyst (%) | 1.5 |
| Temp., initial charge (° C.) | 30 |
| Temp., addition (° C.) | 30 |
| Temp., build (° C.) | 49 |
| Ramp time (min) | 10 |
| Ramp slope (° C./min) | 1.9 |
| Reaction time (min) | 200 |
| FINAL PRODUCT PROPERTIES | |
| Mol. Wt. <10K (%) | — |
| Mol. Wt. >100K (%) | — |
| IV, end of rxn. (dL/g) | — |
| IV, end of cheln. (dL/g) | 0.30 |
| $M_w$, end of rxn. (AMU) | — |
| $M_n$, end of rxn. (AMU) | — |
| $M_w/M_n$, end of rxn. | — |
| $M_w$, end of cheln. (AMU) | 32000 |
| $M_n$, end of cheln. (AMU) | 14000 |
| $M_w/M_n$, end of cheln. | 2.3 |
| Weight % siloxane (%) | 14 |
| Siloxane Incorporation Efficiency (%) | 70 |

PREPARATIVE EXAMPLECL PREPARATIVE EXAMPLES 3-4

This example illustrates the preparation of poly(arylene ether)-polysiloxane multiblock copolymers by the reaction of a hydroxy-diterminated poly(arylene ether), a hydroxyaryl-diterminated polysiloxane, and an aromatic diacid chloride, followed by capping of terminal hydroxy groups with benzoyl chloride. This is a presently preferred method for synthesizing poly(arylene ether)-polysiloxane block copolymers having high polysiloxane content. Both examples used an acid chloride to hydroxy group molar ratio of 0.99:1, a 25° C. reaction temperature, a 3:1 molar ratio of benzoyl chloride capping agent to residual hydroxy groups on the multiblock copolymer, a 20 minute benzoyl chloride addition time, and a 2 hour benzoyl chloride reaction time following complete addition of benzoyl chloride.

A detailed polymerization and isolation procedure is as follows. Make a 20% weight/volume solution of the purified acid chloride in dichloromethane and transfer it to an addition funnel. Under anhydrous condition, make a 20% weight/volume solution of the hydroxy-diterminated poly(arylene ether) in dichloromethane and transfer it to a two-neck reaction flask kept at room temperature. With efficient stirring in the reaction flask, gradually pour a 20% weight/volume solution of the hydroxyaryl-diterminated polysiloxane in dichloromethane into the reaction flask. Once a homogenous solution is obtained, add a 20% weight/volume solution of triethylamine in dichloromethane to the homogenous reaction mass while continuing to stir the reaction flask contents. Begin drop-wise addition of the terephthaloyl chloride solution and maintain an addition rate such that the entire solution is added into the reaction flask within 60 minutes. After addition of the terephthaloyl chloride solution has been completed, continue the reaction for an additional three hours. After a total reaction time of 4 hours, terminate the stirring of the reaction mixture and slowly pour the reaction mixture volume into six volumes of methanol with vigorous stirring, causing precipitation of the block copolymer product. Continue stirring for at least one hour to facilitate removal of trapped dichloromethane and dissolution of the triethylammonium hydrochloride salt byproduct in methanol. Slowly decant the methanol, isolate the product copolymer (e.g., by filtration), and dry the product copolymer in vacuum at 80° C.

Reagent amounts and properties of the resulting multiblock copolymers are summarized in Table 4. For the reagents in Table 4, "PPE-2OH, 0.09" is a copolymer of 2,6-xylenol and 2,2-bis(4-hydroxy-3,5-dimethylphenyl)propane (CAS Reg. No. 1012321-47-9), having an average of about 1.9 terminal hydroxy groups per molecule and an intrinsic viscosity of 0.09 deciliter per gram in chloroform at 25° C., obtained as MX90-100-0 from SABIC Innovative Plastics; "Eugenol-D10" is a eugenol-diterminated polydimethylsiloxane (CAS Reg. No. 156065-00-8), having an average of about 10 polydimethylsiloxane units per molecule, obtained as Y-17126 from Momentive Performance Materials. "PPE-2OH, 0.09 (Wt %)" is the weight percent of the "PPE-2OH, 0.09" reagent, based on the total weight of the "PPE-2OH, 0.09" reagent and the "Eugenol-D10" reagent. "Eugenol-D10 (Wt %)" is the weight percent of the "Eugenol-D10" reagent based on the total weight of the "PPE-2OH, 0.09" reagent and the "Eugenol-D10" reagent.

For the properties in Table 4, "PPE Incorporation (Wt %)" is the weight percent of poly(arylene ether) blocks in the product multiblock copolymer, based on the total weight of poly(arylene ether) blocks and polysiloxane blocks, as determined by proton nuclear magnetic resonance spectroscopy ($^1$H NMR); "Siloxane Incorporation (Wt %)" is the weight percent of polysiloxane blocks in the product multiblock copolymer, based on the total weight of poly(arylene ether) blocks and polysiloxane blocks, as determined by $^1$H NMR; "$M_n$ (amu)" is the number average molecular weight of the product multiblock copolymer, as determined by gel permeation chromatography with polystyrene standards; "$M_w$ (amu)" is the weight average molecular weight of the product multiblock copolymer, as determined by gel permeation chromatography with polystyrene standards; "$M_w/M_n$" is the polydispersity, or ratio of weight average molecular weight to number average molecular weight; "Residual —OH ends (ppm)" is the content of free (terminal) hydroxy groups, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$P NMR Spectroscopy", *Macromolecules*, volume 27, pages 6371-6375 (1994); "DSC $T_g$ (° C.)" is the glass transition temperature of the poly(arylene ether) blocks, as determined by differential scanning calorimetry; "TGA Decomposition Peak (° C.)" is the peak temperature in a plot of the derivative of weight versus temperature as determined by derivative thermogravimetric analysis (dTGA); "MVR @280° C./2.16 kg" is the melt volume-flow rate, expressed in units of milliliters per 10 minutes (mL/10 min), measured according to ASTM D1238-04c, using a temperature of 280° C. and a load of 2.16 kilograms; "Tensile Modulus (MPa)" is the tensile modulus, expressed in units of megapascals (MPa), measured at 23° C. according to ASTM D638-08; "Tensile Stress @Break (MPa)", is the tensile stress at break, expressed in units of megapascals, measured at 23° C. according to ASTM D638-08; "Tensile Elongation @ Break (%)" is the tensile elongation at break, expressed in percent, measured at 23° C. according to ASTM D638-08; "Hardness (Shore D)", is the Shore D durometer hardness, expressed without units, measured at 23° C. according to ASTM D2240-05; "NII@23° C. (kJ/m$^2$)" and "NII@0° C. (kJ/m$^2$)" notched Izod impact strength values at 23° C. and 0° C., respectively, expressed in units of kilojoules per meter, measured according to ISO 180/A1; "MAI Total Energy @23° C. (J)" and "MAI Total Energy @0° C. (J)" are multi-axial impact strengths, expressed in units of joules (J), measured at 23° C. and 0° C., respectively, on 3.2 millimeter thick, 102 millimeter diameter discs according to ASTM D3763-08, with a "(D)" following the reported value denoting ductile failure, and a "(B)" following the reported value denoting brittle failure; "Tension Set at 48 hours (%)" was measured according to ASTM D412-06ae2; "Trouser Tear Strength, Type T (kN/m)" was measured according to ASTM D624-00(2007); "Dielectric Strength (kV/mm)" was measured according to ASTM D149-09 at a frequency of 500 volts/sec; Dielectric constants ("Dk") and dissipation factors ("Df") were determined according to ASTM D150-98(2004); Volume resistivity, expressed in units of ohm-centimeters, and surface resistivity, expressed in units of ohms, were measured at 23° C. according to ASTM D275-07.

Also in Table 4, "UL 94 Rating, 2 mm" and "UL 94 Rating, 1.6 mm" are Vertical Burn Test ratings measured at sample thicknesses of 2 millimeters and 1.6 millimeters, respectively, according to Underwriter's Laboratory Bulletin 94, "Tests for Flammability of Plastic Materials, UL 94", Vertical Burning Flame Test. In this procedure, a test bar with dimensions 125×12.59×3.2 millimeters is mounted vertically. A 1.9 centimeter (three-quarter inch) flame is applied to the end of the test bar for 10 seconds and removed. The time to extinguish is measured for ten samples, and the standard deviation calculated (first burn time; "UL 94 FOT T1, 2 mm (sec)" and "UL 94 FOT T1, 1.6 mm (sec)" in Table 4). The flame is reapplied for another 10 seconds and removed. The time to extinguish is measured (second burn time; "UL 94 FOT T2, 2 mm (sec)" and "UL 94 FOT T2, 1.6 mm (sec)" in Table 4). For a V-0 rating, no individual burn times from the first or second flame application may exceed 10 seconds; the total of the burn times for any five specimens may not exceed 50 seconds; and drip particles that ignite a piece of cotton gauze situated below the specimen are not allowed; burn-to-clamps is not allowed. For a V-1 rating, no individual burn times from the first or second flame application may exceed 30 seconds; the total of the burn times for any five specimens may not exceed 250 seconds; and drip particles that ignite a piece of cotton gauze situated below the specimen are not allowed. For a V-2 rating, no individual burn times from the first or second flame application may exceed 30 seconds; the total of the burn times for any five specimens may not exceed 250 seconds; and drip particles that ignite a piece of cotton gauze situated below the specimen are allowed, but burn-to-clamps is not allowed. "UL 94 Drip, 2 mm" and "UL 94 Drip, 1.6 mm" are visual observations of dripping measured during vertical burn testing at sample thicknesses of 2 millimeters and 1.6 millimeters, respectively, with a value of "ND" corresponding to no drips observed, and a value of "D" corresponding to at least one drip observed. The smoke density parameters "DS4 (min)" and "DSMax (min)" were measured according to ASTM E662-09.

TABLE 4

|  | P. Ex. 3 | P. Ex. 4 |
|---|---|---|
| PPE-2OH, 0.09 (Wt %) | 40 | 30 |
| Eugenol-D10 (Wt %) | 60 | 70 |
| PPE Incorporation (Wt %) | 42.5 | 32.62 |
| Siloxane Incorporation (Wt %) | 57.5 | 67.38 |
| $M_n$ (amu) | 37000 | 39000 |
| $M_w$ (amu) | 72000 | 82000 |
| $M_w/M_n$ | 1.945 | 1.9 |
| Residual —OH ends (ppm) | 53.87 | 61.46 |
| DSC $T_g$ (° C.) | 147.83 | 144.6 |
| TGA Decomposition Peak (° C.) | 472.6 | 465.9 |
| MVR @ 280° C./2.16 kg (mL/10 min) | 6.62 | 38.8 |
| Tensile Modulus (MPa) | 313.41 | 118.02 |
| Tensile Stress @ Break (MPa) | 12.07 | 7.87 |
| Tensile Elongation @ Break (%) | 66.27 | 191.08 |

TABLE 4-continued

| | P. Ex. 3 | P. Ex. 4 |
|---|---|---|
| Hardness (Shore D) | 58 | 40 |
| NII @ 0° C. (kJ/m$^2$) | 22.36 | 36.67 |
| NII @ −30° C. (kJ/m$^2$) | 12.788 | 24.088 |
| MAI Total Energy @ 0° C. (J) | 67.29 (D) | 76.19 (D) |
| MAI Total Energy @ −30° C. (J) | 57.88 (D) | 58.7 (D) |
| Tension Set at 48 hours (%) | 33.34 | 20.08 |
| Trouser Tear Strength, Type T (kN/m) | 34.95 | 17.8 |
| VST (° C.) | 85 | 55 |
| Dielectric Strength (kV/mm) | 27.89 | 26.65 |
| Dk (100 MHz) | 2.784 | 2.782 |
| Dk (500 MHz) | 2.729 | 2.71 |
| Dk (1000 MHz) | 2.596 | 2.543 |
| Df (100 MHz) | 0.0078 | 0.0074 |
| Df (500 MHz) | 0.0057 | 0.0051 |
| Df (1000 MHz) | 0.0048 | 0.0037 |
| Volume Resistivity (Ohm-cm) | 1.25E+13 | 2.12E+12 |
| Surface Resistivity (Ohm) | 1.57E+15 | 4.09E+14 |
| UL 94 Rating (2 mm) | V0 | V0 |
| UL 94 FOT T1 at 2 mm (sec) | 1.6(0.68) | 3.23(1.07) |
| UL 94 FOT T2 at 2 mm (sec) | 4.2(1.7) | 1.74(1.32) |
| UL 94 Drip at 2 mm | 10/10 ND | 10/10 D |
| UL 94 Rating at 1.6 mm | V0 | V2 |
| UL 94 FOT T1 at 1.6 mm (sec) | 1.58(0.26) | 3.69(1.55) |
| UL 94 FOT T2 at 1.6 mm (sec) | 4.19(1.37) | 0.71(.97) |
| UL 94 Drip at 1.6 mm | 10/10 ND | 10/10 D |
| UL 94 Rating at 1 mm | V2 | V2 |
| UL 94 FOT T1 at 1 mm (sec) | 3.98(2.86) | 2.92(0.98) |
| UL 94 FOT T2 at 1 mm (sec) | 2.85(3.23) | 3.3(3.02) |
| UL 94 Drip at 1 mm | 10/10 D | 10/10 D |
| UL 94 Rating at 0.8 mm | V2 | V2 |
| UL 94 FOT T1 at 0.8 mm (sec) | 3.12(1.45) | 5.52(2.96) |
| UL 94 FOT T2 at 0.8 mm (sec) | 0.94(1.24) | 2.18(2.04) |
| UL 94 Drip at 0.8 mm | 9/10 D | 10/10 D |
| Smoke DS4 (min) | 89.67 | 36.67 |
| Smoke DSMax (min) | 229 | 106 |

COMPARATIVE EXAMPLES 1-5

The components used to prepare all the working examples are described in Table 5.

TABLE 5

| Component | Description |
|---|---|
| PA66 | Polyamide-6,6, CAS Reg. No. 32131-17-2, having a relative viscosity of 48 dl/g according ISO307, in pellet form; obtained as VYDYNE 21Z from Solutia Inc. Might be easier to say |
| PPE 0.46 | Poly(2,6-dimethyl-1,4-phenylene)ether having an intrinsic viscosity of 0.46 deciliter per gram, measured at 25° C. in chloroform; obtained as PPO 646 from Sabic Innovative Plastics, US LLC |
| PPE 0.46/CA | 98 weight percent PPE 0.46 pre-compounded with 2 weight percent citric acid |
| PPE-Si5% | Poly(arylene ether)-polysiloxane block copolymer with 5 weight percent polysiloxane content and an intrinsic viscosity of 0.45 deciliter/gram as measured at 25° C. in chloroform; prepared as described in Preparative Example 1 |
| PPE-Si20% | Poly(arylene ether)-polysiloxane block copolymer with 20 weight percent polysiloxane content and an intrinsic viscosity of 0.44 deciliter/gram as measured at 25° C. in chloroform; prepared as described in Preparative Example 2 |
| PPE-Si5%/CA | 98 weight percent PPE-Si5% pre-compounded with 2 weight percent citric acid |
| PPE-Si20%/CA | 98 weight percent PPE-Si20% pre-compounded with 2 weight percent citric acid |
| Citric acid | Citric acid, obtained from International Chemical Corporation |
| Antioxidant | Hindered phenolic antioxidant, octadecyl 3,5-di-tert-butyl-4-hydroxyhydrocynnamate (CAS Reg. No. 2082-79-3); obtained as IRGANOX 1076 from Great Lakes Chemical Corporation |
| KI solution | Potassium iodide 50% solution in water; obtained from Ajay North America Incorporated |
| CuI | Cuprous iodide; obtained from Ajay North America Incorporated |
| Br-PS | Polystyrene with an average of about 2.7 bromine atoms per phenyl ring, essentially no bromination of the aliphatic carbon atoms, and a total of about 68.5 weight percent bromine, CAS Reg. No. 88497-56-7; obtained as SAYTEX HP-3010PST from Albemarle Corp. |
| SbO$_3$ | Antimony trioxide, CAS Reg. No. 1309-63-4 from Brightsun |
| TSAN | Poly(styrene-acrylonitrile)-encapsulated poly(tetrafluoroethylene); obtained as TSAN F-449 from Sabic Innovative Plastics, US LLC |
| Glass | Glass fibers surface treated for polyamide, having a diameter of about 10 micrometers and an initial length of about 3 millimeters; obtained as CHOPVANTAGE 3540 from PPG Industries |

Comparative Examples 1-5 were prepared using the components and amounts specified in Table 6, where all component amounts are in parts by weight. The blend formulations were prepared by dry blending the poly(arylene ether) or poly(arylene ether)-polysiloxane block copolymer, citric acid, stabilizers, and flame retardant. This mixture was fed into the extruder in the upstream or throat location. The polyamide-6,6 was fed using a separate feeder, but also added in the throat location. The glass fibers were fed using another separate feeder, but these fibers were added at a downstream location. The extruder used was a 30-millimeter Werner-Pfleiderer twin-screw extruder. The extruder was set with barrel temperatures of 290-300° C. and a die temperature of 300° C., with the screw rotating at 300 rotations per minute (rpm), and with a throughput rate of about 20 kilograms per hour. Component amounts are expressed in parts by weight. The compositions were injection molded on an 85 ton Van Dorn injection molding machine. Prior to molding the pellets were dried at 110° C. (230° F.) for 4 hours. The injection molding conditions were as follows. The injection mold was set to a temperature of 90° C. (194° F.) and the heating zones of the injection molding machine were all set at 300° C. (572° F.).

Property values for Comparative Examples 1-5 are presented in Table 6.

Flammability tests were performed following the procedure of Underwriter's Laboratory Bulletin 94 entitled "Tests for Flammability of Plastic Materials, UL 94", specifically the Vertical Burning Test. Several ratings can be applied based on the rate of burning, time to extinguish, ability to resist dripping, and whether or not the drips are burning. According to this procedure, materials can be classified as UL 94 V-0, V-1, or V-2 on the basis of the test results obtained for five samples of each composition. The criteria for each of these flammability classifications are described below.

V-0: In a sample placed so that its long axis is parallel to the flame, the average period of flaming and/or smoldering after removing the igniting flame should not exceed ten seconds and none of the vertically placed samples should produce drips of burning particles that ignite absorbent cotton. For five bars, the total burn time, including all first burns and all second burns should not exceed 50 seconds.

V-1: In a sample placed so that its long axis is parallel to the flame, the average period of flaming and/or smoldering after removing the igniting flame should not exceed thirty seconds and none of the vertically placed samples should produce drips of burning particles that ignite absorbent cotton. For five bars, the total burn time, including all first burns and all second burns should not exceed 250 seconds.

V-2: In a sample placed so that its long axis is parallel to the flame, the average period of flaming and/or smoldering after removing the igniting flame should not exceed thirty seconds and the vertically placed samples produce drips of burning particles that ignite cotton. For five bars, the total burn time, including all first burns and all second burns should not exceed 250 seconds.

Fail: Does not meet V-2 criteria.

Density values, expressed in grams/milliliter (g/mL), were determined at 23° C. according to ASTM D 792-08. Flexural modulus values, expressed in megapascals, were determined at 23° C. according to ASTM D790-07e1. Values of heat deflection temperature under load (HDT), expressed in degrees centigrade, were determined at a load of 1.8 megapascals according to ASTM D648-07. Notched Izod impact strength values, expressed in kilojoules per meter$^2$, were determined according to ASTM D256-06ae1. Values of tensile modulus, expressed in megapascals, tensile strength at yield, expressed in megapascals, and tensile elongation at break, expressed in percent, were determined at 23° C. according to ASTM D638-08.

Table 6 presents formulations based on 25% glass fiber reinforced polyamide in which the flame retardant is a combination of brominated polystyrene and antimony trioxide in a weight ratio of 3.5:1. Table 6 illustrates the point at which a 25% glass fiber reinforced polyamide-6,6 formulation achieves UL 94 V-0 flame retardancy performance using a halogenated FR system. UL 94 V-0 performance is achieved with a 25% glass fiber filled polyamide-6,6 formulation when 25% brominated polystyrene in conjunction with 7.15% antimony trioxide is added to the polyamide-6,6 matrix.

TABLE 6

|  | C. Ex. 1 | C. Ex. 2 | C. Ex. 3 | C. Ex. 4 | C. Ex. 5 |
| --- | --- | --- | --- | --- | --- |
| COMPOSITIONS | | | | | |
| Br-PS | 10 | 15 | 20 | 25 | 30 |
| SbO$_3$ | 2.85 | 4.3 | 5.7 | 7.15 | 8.55 |
| PA66 | 62.15 | 55.7 | 49.3 | 42.85 | 36.45 |
| TSAN | 0.15 | 0.15 | 0.15 | 0.15 | 0.15 |
| Glass | 25 | 25 | 25 | 25 | 25 |
| PROPERTIES | | | | | |
| UL94 Rating at 2.0 mm | Fail | Fail | V-1 | V-0 | V-0 |
| UL94 Rating at 1.0 mm | Fail | Fail | Fail | V-0 | V-0 |
| Density (g/mL) | 1.440 | 1.503 | 1.569 | 1.650 | 1.729 |
| Flexural modulus (MPa) | 8749 | 9157 | 9896 | 10230 | 10834 |
| HDT at 1.8 MPa (° C.) | 250 | 250 | 249 | 250 | 249 |
| Notched Izod (kJ/m$^2$) | 7.6 | 8.2 | 8.5 | 9.0 | 8.8 |
| Tensile modulus (MPa) | 9204 | 9698 | 10201 | 10827 | 11050 |
| Tensile strength at yield (MPa) | 169.7 | 169.0 | 165.4 | 158.2 | 148.0 |
| Tensile elongation at break (%) | 2.7 | 2.6 | 2.3 | 2.1 | 1.9 |

EXAMPLES 1-6, COMPARATIVE EXAMPLES 6 AND 7

Table 7 presents compositions and properties for polyamide compositions in which the flame retardant is a blend of brominated polystyrene, antimony trioxide, and a poly(arylene ether) homopolymer or poly(arylene ether)-polysiloxane block copolymer. All samples contain about 25 weight percent glass fiber. In these experiments, the poly(arylene ether) homopolymer or block copolymers were first compounded with citric acid before being melt blending with the other components.

The data in Table 6, above, illustrate that for a 25% glass filled polyamide-6,6, the formulation requires 25% brominated polystyrene with 7.15% antimony trioxide to achieve a UL94 V-0 rating at a thickness of 1 millimeter. The data in Table 7 show that adding a poly(arylene ether) homopolymer or poly(arylene ether)-polysiloxane block copolymer can substantially reduce the amount of flame retardant required for UL94 V-0 performance. The Example 3 composition uses only about 15% brominated polystyrene and about 4.3% antimony trioxide to achieve a UL94 V-0 rating at a thickness of 1 millimeter.

TABLE 7

|  | C. Ex. 6 | C. Ex. 7 | Ex. 1 | Ex. 2 | Ex. 3 | Ex. 4 | Ex. 5 | Ex. 6 |
|---|---|---|---|---|---|---|---|---|
| COMPOSITIONS | | | | | | | | |
| Br-PS | 5 | 5 | 10 | 10 | 15 | 15 | 20 | 20 |
| PPE 0.46/CA | 30 | 0 | 25 | 0 | 20 | 0 | 15 | 0 |
| PPE-Si5%/CA | 0 | 30 | 0 | 25 | 0 | 20 | 0 | 15 |
| SbO$_3$ | 1.42 | 1.42 | 2.85 | 2.85 | 4.3 | 4.3 | 5.7 | 5.7 |
| TSAN | 0.15 | 0.15 | 0.15 | 0.15 | 0.15 | 0.15 | 0.15 | 0.15 |
| PA66 | 38.58 | 38.58 | 37.15 | 37.15 | 35.7 | 35.7 | 34.3 | 34.3 |
| Glass | 25 | 25 | 25 | 25 | 25 | 25 | 25 | 25 |
| PROPERTIES | | | | | | | | |
| UL94 Rating at 2.0 mm | Fail | Fail | Fail | Fail | V0 | V0 | V0 | V0 |
| UL94 Rating at 1.0 mm | Fail | Fail | Fail | V1 | V0 | V0 | V0 | V0 |
| Density (g/mL) | 1.369 | 1.351 | 1.399 | 1.403 | 1.478 | 1.467 | 1.547 | 1.543 |
| Flexural modulus (MPa) | 8069 | 8040 | 8152 | 8255 | 8791 | 8830 | 9410 | 9623 |
| HDT at 1.8 MPa (° C.) | 229.40 | 227.30 | 237.20 | 228.60 | 239.90 | 234.10 | 241.70 | 237.10 |
| Notched Izod (kJ/m$^2$) | 8.8 | 7.9 | 7.4 | 8.7 | 7.5 | 8.1 | 7.7 | 8.2 |
| Tensile modulus (MPa) | 8245 | 8296 | 8407 | 8424 | 8839 | 8922 | 9492 | 9601 |
| Tensile strength at yield (MPa) | 151.8 | 160.0 | 156.4 | 152.2 | 154.1 | 151.5 | 152.3 | 150.2 |
| Tensile elongation at break (%) | 2.9 | 2.8 | 2.8 | 2.7 | 2.5 | 2.4 | 2.3 | 2.2 |

EXAMPLES 7-10, COMPARATIVE EXAMPLES 8-12

These examples illustrate the effect of poly(arylene ether) homopolymer and block copolymer in compositions containing brominated polystyrene but no antimony trioxide synergist. Avoiding the use of antimony trioxide is desirable for some applications in that it can contain traces of heavy metals including arsenic and lead. Many electronic applications require no heavy metals present in the product.

In Table 8, Comparative Examples 8-12 do not contain any poly(arylene ether), while Examples 7-10 add various amounts of poly(arylene ether) homopolymer or poly(arylene ether)-polysiloxane block copolymer. Among the nine samples, only Example 10 exhibits UL94 V-0 performance at 1 millimeter thickness. Example 10 was prepared with about 20 weight percent brominated polystyrene and about 15 weight percent of the PPE-Si5% block copolymer. The corresponding sample made with poly(arylene ether) homopolymer, Example 9, failed the UL94 vertical burn test at sample thicknesses of 1 and at 2 millimeters. This demonstrates that poly(arylene ether)-polysiloxane block copolymer is a more effective flame retardant synergist than poly(arylene ether).

EXAMPLE 11

This example illustrates a composition without glass fibers. For this experiment, notched and unnotched Izod values were measured according to ASTM D256-06ae1 and expressed in units of joules/meter (J/m). UL 94 ratings were determined at thickness of 1.5875 millimeter (1/16 inch) and 0.79375 millimeter (1/32 inch). The composition and properties are summarized in Table 9.

TABLE 9

|  | Ex. 11 |
|---|---|
| COMPOSITION | |
| PA66 | 32.7 |
| PPE 0.46 | 20.0 |
| Br-PS | 16.0 |
| SbO$_3$ | 6.0 |
| Citric acid | 0.3 |
| PROPERTIES | |
| Unnotched Izod (J/m) | 534 |
| Notched Izod (J/m) | 5.3 |

TABLE 8

|  | C. Ex. 8 | C. Ex. 9 | C. Ex. 10 | C. Ex. 11 | C. Ex. 12 | Ex. 7 | Ex. 8 | Ex. 9 | Ex. 10 |
|---|---|---|---|---|---|---|---|---|---|
| COMPOSITIONS | | | | | | | | | |
| Br-PS | 10 | 15 | 20 | 25 | 30 | 10 | 10 | 20 | 20 |
| PPE 0.46/CA | 0 | 0 | 0 | 0 | 0 | 25 | 0 | 15 | 0 |
| PPE-Si5%/CA | 0 | 0 | 0 | 0 | 0 | 0 | 25 | 0 | 15 |
| PA66 | 65 | 60 | 55 | 50 | 45 | 40 | 40 | 40 | 40 |
| TSAN | 0.15 | 0.15 | 0.15 | 0.15 | 0.15 | 0.15 | 0.15 | 0.15 | 0.15 |
| Glass | 25 | 25 | 25 | 25 | 25 | 25 | 25 | 25 | 25 |
| PROPERTIES | | | | | | | | | |
| UL94 Rating at 2.0 mm | Fail | Fail | Fail | Fail | Fail | Fail | Fail | Fail | V0 |
| UL94 Rating at 1.0 mm | Fail | Fail | Fail | Fail | Fail | Fail | Fail | Fail | V0 |
| Density (g/mL) | 1.417 | 1.451 | 1.500 | 1.537 | 1.582 | 1.410 | 1.385 | 1.474 | 1.483 |
| Flexural modulus (MPa) | 8394 | 8715 | 9090 | 9663 | 10066 | 8723 | 8174 | 8987 | 8901 |
| HDT at 1.8 MPa (° C.) | 246 | 247 | 247 | 244 | 244 | 224 | 233 | 234 | 240 |
| Notched Izod (kJ/m$^2$) | 8.4 | 8.6 | 9.9 | 9.7 | 10.3 | 9.3 | 9.7 | 9.3 | 9.7 |
| Tensile modulus (MPa) | 9389 | 9513 | 9914 | 10229 | 10301 | 9418 | 9099 | 9865 | 9742 |
| Tensile strength at yield (MPa) | 166.6 | 164.8 | 165.1 | 164.3 | 156.5 | 165.4 | 151.8 | 162.6 | 152.8 |
| Tensile elongation at break (%) | 3.0 | 2.9 | 2.8 | 2.5 | 2.4 | 2.7 | 2.6 | 2.6 | 2.5 |

TABLE 9-continued

|  | Ex. 11 |
| --- | --- |
| Flexural strength (MPa) | 162 |
| Flexural modulus (MPa) | 7095 |
| UL 94 rating at 1.59 mm | V-0 |
| UL 94 rating at 0.79 mm | V-0 |

In conclusion, glass-filled polyamide blends containing either a metal dialkylphosphinate flame retardant or a brominated polystyrene flame retardant show substantial improvements in flame retardancy when a poly(arylene ether) was added. In some blends, the improvements are greatest when a poly(arylene ether)-polysiloxane block copolymer is used. Reductions in flame retardant content of up to 40% have been demonstrated. The compositions containing poly(arylene ether) also exhibit much lower specific gravity.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition comprising the product of melt blending:
    about 30 to about 60 weight percent of a polyamide;
    a flame retardant comprising about 10 to about 25 weight percent brominated polystyrene; and
    about 5 to about 30 weight percent of a polymeric flame retardant synergist selected from the group consisting of mixtures of poly(arylene ether)s and poly(arylene ether)-polysiloxane block copolymers; and wherein the poly(arylene ether)-polysiloxane block copolymer is the product of a process comprising oxidatively copolymerizing a monomer mixture comprising a monohydric phenol and a hydroxyaryl-terminated polysiloxane;
    wherein at least 80 weight percent of the hydroxyaryl-terminated polysiloxane in the monomer mixture is incorporated into the poly(arylene ether)-polysiloxane block copolymer;
    wherein the composition comprises less than or equal to 0.1 weight percent of any polymer other than the polyamide, the brominated polystyrene, and the polymeric flame retardant synergist; and
    wherein all weight percent are based on the total weight of the composition.

2. The composition of claim 1, wherein the brominated polystyrene comprises an average of about 2 to about 4 bromine atoms per phenyl ring and less than or equal to 5 mole percent bromination of aliphatic carbon atoms.

3. The composition of claim 1, wherein the monomer mixture comprises about 90 to about 99 parts by weight of the monohydric phenol and about 1 to about 10 parts by weight of the hydroxyaryl-terminated polysiloxane, based on the total weight of the monohydric phenol and the hydroxyaryl terminated polysiloxane.

4. The composition of claim 1, wherein the hydroxyaryl-terminated polysiloxane comprises a hydroxyaryl-diterminated polysiloxane comprising a plurality of repeating units having the structure

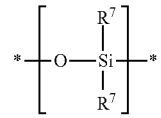

wherein each occurrence of $R^7$ is independently hydrogen, $C_1$-$C_{12}$ hydrocarbyl or $C_1$-$C_{12}$ halohydrocarbyl; and two terminal units having the structure

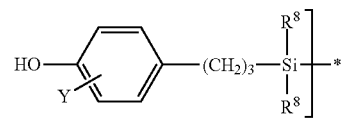

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl.

5. The composition of claim 1, wherein the monohydric phenol comprises 2,6-dimethylphenol, and the hydroxyaryl terminated polysiloxane has the structure

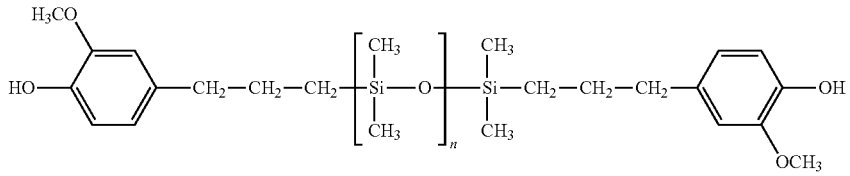

wherein n is, on average, about 5 to about 100.

6. The composition of claim 1, comprising about 10 to about 25 weight percent of the poly(arylene ether)-polysiloxane block copolymer.

7. The composition of claim 1, wherein the poly(arylene ether)-polysiloxane block copolymer provides about 0.5 to about 2 weight percent polysiloxane to the composition.

8. The composition of claim 1, comprising less than or equal to 0.05 weight percent free polysiloxane.

9. The composition of claim 1, further comprising about 2 to about 40 weight percent glass fibers.

10. The composition of claim 1, further comprising about 5 to about 15 weight percent glass fibers.

11. The composition of claim 1, further comprising about 20 to about 40 weight percent glass fibers.

12. The composition of claim 1, wherein the polymeric flame retardant synergist is halogen free.

13. The composition of claim 1, wherein the flame retardant further comprises about 1 to about 10 weight percent antimony trioxide.

14. The composition of claim 1, further comprising the product of melt blending about 0.1 to about 1 weight percent of a compatibilizing agent with the polyamide, the brominated polystyrene, and the polymeric flame retardant synergist; wherein the compatibilizing agent is selected from the group consisting of quinones, organosilane compounds, maleic acid, maleic anhydride, fumaric acid, glycidyl acrylate, itaconic acid, aconitic acid, maleimide, maleic hydrazide, dichloro maleic anhydride, maleic acid amide, acrylic acid, butenoic acid, methacrylic acid, pentenoic acid, decenoic acids, undecenoic acids, dodecenoic acids, linoleic acid, crotyl alcohol, methyl vinyl carbinol, 4-pentene-1-ol, 1,4-hexadiene-3-ol, 3-butene-1,4-diol, 2,5-diol, and combinations thereof.

15. The composition of claim 1,
wherein the composition comprises the product of melt blending
about 30 to about 40 weight percent of the polyamide,
about 15 to about 30 weight percent of the flame retardant, and
about 12 to about 25 weight percent of the polymeric flame retardant synergist;
wherein the polyamide comprises polyamide-6,6;
wherein the flame retardant comprises about 12 to about 25 weight percent of the brominated polystyrene;
wherein the flame retardant further comprises about 3 to about 8 weight percent of antimony trioxide; and
wherein the composition further comprises about 20 to about 30 weight percent glass fibers.

16. The composition of claim 1, exhibiting a flame retardancy rating of V-1 or V-0 at a thickness of 3 millimeters, measured according to Underwriter's Laboratory Bulletin 94, "Tests for Flammability of Plastic Materials, UL 94", Vertical Burning Flame Test.

17. The composition of claim 1, exhibiting a flame retardancy rating of V-1 or V-0 at a thickness of 2 millimeters, measured according to Underwriter's Laboratory Bulletin 94, "Tests for Flammability of Plastic Materials, UL 94", Vertical Burning Flame Test.

18. The composition of claim 1, exhibiting a flame retardancy rating of V-1 or V-0 at a thickness of 1 millimeter, measured according to Underwriter's Laboratory Bulletin 94, "Tests for Flammability of Plastic Materials, UL 94", Vertical Burning Flame Test.

19. The composition of claim 1,
wherein the composition comprises the product of melt blending
about 35 to about 45 weight percent of the polyamide,
about 15 to about 25 weight percent of the flame retardant, and
about 10 to about 20 weight percent of the polymeric flame retardant synergist;
wherein the polyamide comprises polyamide-6,6;
wherein the flame retardant comprises about 15 to about 25 weight percent of the brominated polystyrene;
wherein the flame retardant further comprises less than or equal to 1 weight percent of antimony trioxide; and
wherein the composition further comprises about 20 to about 30 weight percent glass fibers.

20. An article comprising the composition of claim 1.

21. The composition of claim 1, wherein at least 95 weight percent of the hydroxyaryl-terminated polysiloxane is incorporated into the poly(arylene ether)-polysiloxane block copolymer.

22. A method of forming a composition, comprising:
melt blending
about 30 to about 60 weight percent of a polyamide,
a flame retardant comprising about 10 to about 25 weight percent brominated polystyrene, and
about 5 to about 30 weight percent of a polymeric flame retardant synergist selected from the group consisting of mixtures of poly(arylene ether)s and poly(arylene ether)-polysiloxane block copolymers to form a composition;
wherein the poly(arylene ether)-polysiloxane block copolymer is the product of a process comprising oxidatively copolymerizing a monomer mixture comprising a monohydric phenol and a hydroxyaryl-terminated polysiloxane;
wherein at least 80 weight percent of the hydroxyaryl-terminated polysiloxane in the monomer mixture is incorporated into the poly(arylene ether)-polysiloxane block copolymer;
wherein the composition comprises less than or equal to 0.1 weight percent of any polymer other than the polyamide, the brominated polystyrene, and the polymeric flame retardant synergist; and
wherein all weight percent are based on the total weight of the composition.

23. The method of claim 22, further comprising melt blending about 0.1 to about 1 weight percent of a compatibilizing agent with the polyamide, the brominated polystyrene, and the polymeric flame retardant synergist; wherein the compatibilizing agent is selected from the group consisting of quinones, organosilane compounds, maleic acid, maleic anhydride, fumaric acid, glycidyl acrylate, itaconic acid, aconitic acid, maleimide, maleic hydrazide, dichloro maleic anhydride, maleic acid amide, acrylic acid, butenoic acid, methacrylic acid, pentenoic acid, decenoic acids, undecenoic acids, dodecenoic acids, linoleic acid, crotyl alcohol, methyl vinyl carbinol, 4-pentene-1-ol, 1,4-hexadiene-3-ol, 3-butene-1,4-diol, 2,5-dimethyl-3-hexene-2,5-diol, and combinations thereof.

24. The method of claim 23, wherein the polymeric flame retardant synergist and the compatibilizing agent are melt blended with each other prior to melt blending with the polyamide and the brominated polystyrene.

25. The method of claim 23, wherein the polyamide and the flame retardant are melt blended with each other prior to melt blending with the polymeric flame retardant synergist and the compatibilizing agent.

26. The method of claim 22, wherein at least 95 weight percent of the hydroxyaryl-terminated polysiloxane is incorporated into the poly(arylene ether)-polysiloxane block copolymer.

\* \* \* \* \*